US012657755B2

(12) United States Patent
Toth

(10) Patent No.: US 12,657,755 B2
(45) Date of Patent: Jun. 16, 2026

(54) SYSTEMS AND METHODS FOR EXERCISE TRACKING

(71) Applicant: iFIT Inc., Logan, UT (US)

(72) Inventor: Dawson Toth, Elkton, MD (US)

(73) Assignee: iFIT Inc., Logan, UT (US)

( * ) Notice: Subject to any disclaimer, the term of this patent is extended or adjusted under 35 U.S.C. 154(b) by 406 days.

(21) Appl. No.: 18/141,872

(22) Filed: May 1, 2023

(65) Prior Publication Data

US 2023/0360248 A1     Nov. 9, 2023

Related U.S. Application Data

(60) Provisional application No. 63/338,265, filed on May 4, 2022.

(51) Int. Cl.
| | |
|---|---|
| *G06T 7/70* | (2017.01) |
| *G06T 7/55* | (2017.01) |
| *G06V 40/10* | (2022.01) |
| *H04N 7/18* | (2006.01) |

(52) U.S. Cl.
CPC .................. *G06T 7/70* (2017.01); *G06T 7/55* (2017.01); *G06V 40/10* (2022.01); *H04N 7/181* (2013.01); *G06T 2207/10028* (2013.01); *G06T 2207/30196* (2013.01)

(58) Field of Classification Search
CPC . G06T 2207/10028; G06T 2207/20081; G06T 2207/20084; G06T 2207/30196; G06T 2207/30221; G06T 7/251; G06T 7/55;

G06T 7/70; G06V 10/764; G06V 10/82; G06V 20/52; G06V 20/64; G06V 40/10; G06V 40/23; H04N 7/181
See application file for complete search history.

(56) References Cited

U.S. PATENT DOCUMENTS

| | | | |
|---|---|---|---|
| 3,123,646 | A | 3/1964 | Easton |
| 3,579,339 | A | 5/1971 | Chang et al. |
| 4,023,795 | A | 5/1977 | Pauls |
| 4,300,760 | A | 11/1981 | Bobroff |
| D286,311 | S | 10/1986 | Martinell et al. |
| 4,681,318 | A | 7/1987 | Lay |

(Continued)

OTHER PUBLICATIONS

Y. Segal et al., "Camera Setup and OpenPose Software without GPU for Calibration and Recording in Telerehabilitation Use," 2021 International Conference on e-Health and Bioengineering (EHB), Iasi, Romania, 2021, pp. 1-4.*

(Continued)

*Primary Examiner* — Shahan Ur Rahaman
(74) *Attorney, Agent, or Firm* — Holland & Hart LLP

(57) ABSTRACT

A method of exercise tracking includes collecting a first image of a first field of view (FOV) with a first camera and collecting a second image of a second FOV with a second camera. The method further includes identifying at least part of a user body frame in the first image including a first plurality of nodes and identifying at least part of the user body frame in the second image including a second plurality of nodes. A plurality of shared nodes includes at least two nodes of the first plurality of nodes identified in the second plurality of nodes. The method includes correlating locations of the first plurality of nodes and the second plurality of nodes based on the plurality of shared nodes.

17 Claims, 9 Drawing Sheets

(56) References Cited

U.S. PATENT DOCUMENTS

| | | | |
|---|---|---|---|
| 4,684,126 | A | 8/1987 | Dalebout et al. |
| 4,728,102 | A | 3/1988 | Pauls |
| 4,750,736 | A | 6/1988 | Watterson |
| 4,796,881 | A | 1/1989 | Watterson |
| 4,813,667 | A | 3/1989 | Watterson |
| 4,830,371 | A | 5/1989 | Lay |
| 4,844,451 | A | 7/1989 | Bersonnet et al. |
| 4,850,585 | A | 7/1989 | Dalebout et al. |
| D304,849 | S | 11/1989 | Watterson |
| 4,880,225 | A | 11/1989 | Lucas et al. |
| 4,883,272 | A | 11/1989 | Lay |
| D306,468 | S | 3/1990 | Watterson |
| D306,891 | S | 3/1990 | Watterson |
| 4,913,396 | A | 4/1990 | Dalebout et al. |
| D307,614 | S | 5/1990 | Bingham et al. |
| D307,615 | S | 5/1990 | Bingham et al. |
| 4,921,242 | A | 5/1990 | Watterson |
| 4,932,650 | A | 6/1990 | Bingham et al. |
| D309,167 | S | 7/1990 | Griffin |
| D309,485 | S | 7/1990 | Bingham et al. |
| 4,938,478 | A | 7/1990 | Lay |
| D310,253 | S | 8/1990 | Bersonnet et al. |
| 4,955,599 | A | 9/1990 | Bersonnet et al. |
| 4,971,316 | A | 11/1990 | Dalebout et al. |
| D313,055 | S | 12/1990 | Watterson |
| 4,974,832 | A | 12/1990 | Dalebout |
| 4,979,737 | A | 12/1990 | Kock |
| 4,981,294 | A | 1/1991 | Dalebout et al. |
| D315,765 | S | 3/1991 | Measom et al. |
| 4,998,725 | A | 3/1991 | Watterson et al. |
| 5,000,442 | A | 3/1991 | Dalebout et al. |
| 5,000,443 | A | 3/1991 | Dalebout et al. |
| 5,000,444 | A | 3/1991 | Dalebout et al. |
| D316,124 | S | 4/1991 | Dalebout et al. |
| 5,013,033 | A | 5/1991 | Watterson et al. |
| 5,014,980 | A | 5/1991 | Bersonnet et al. |
| 5,016,871 | A | 5/1991 | Dalebout et al. |
| D318,085 | S | 7/1991 | Jacobson et al. |
| D318,086 | S | 7/1991 | Bingham et al. |
| D318,699 | S | 7/1991 | Jacobson et al. |
| 5,029,801 | A | 7/1991 | Dalebout et al. |
| 5,034,576 | A | 7/1991 | Dalebout et al. |
| 5,058,881 | A | 10/1991 | Measom |
| 5,058,882 | A | 10/1991 | Dalebout et al. |
| D321,388 | S | 11/1991 | Dalebout |
| 5,062,626 | A | 11/1991 | Dalebout et al. |
| 5,062,627 | A | 11/1991 | Bingham |
| 5,062,632 | A | 11/1991 | Dalebout et al. |
| 5,062,633 | A | 11/1991 | Engel et al. |
| 5,067,710 | A | 11/1991 | Watterson et al. |
| 5,072,929 | A | 12/1991 | Peterson et al. |
| D323,009 | S | 1/1992 | Dalebout et al. |
| D323,198 | S | 1/1992 | Dalebout et al. |
| D323,199 | S | 1/1992 | Dalebout et al. |
| D323,863 | S | 2/1992 | Watterson |
| 5,088,729 | A | 2/1992 | Dalebout |
| 5,090,694 | A | 2/1992 | Pauls et al. |
| 5,102,380 | A | 4/1992 | Jacobson et al. |
| 5,104,120 | A | 4/1992 | Watterson et al. |
| 5,108,093 | A | 4/1992 | Watterson |
| D326,491 | S | 5/1992 | Dalebout |
| 5,122,105 | A | 6/1992 | Engel et al. |
| 5,135,216 | A | 8/1992 | Bingham et al. |
| 5,147,265 | A | 9/1992 | Pauls et al. |
| 5,149,084 | A | 9/1992 | Dalebout et al. |
| 5,149,312 | A | 9/1992 | Croft et al. |
| 5,171,196 | A | 12/1992 | Lynch |
| D332,347 | S | 1/1993 | Raadt et al. |
| 5,190,505 | A | 3/1993 | Dalebout et al. |
| 5,192,255 | A | 3/1993 | Dalebout et al. |
| 5,195,937 | A | 3/1993 | Engel et al. |
| 5,203,826 | A | 4/1993 | Dalebout |
| D335,511 | S | 5/1993 | Engel et al. |
| D335,905 | S | 5/1993 | Cutter et al. |
| D336,498 | S | 6/1993 | Engel et al. |
| 5,217,487 | A | 6/1993 | Engel et al. |
| D337,361 | S | 7/1993 | Engel et al. |
| D337,666 | S | 7/1993 | Peterson et al. |
| D337,799 | S | 7/1993 | Cutter et al. |
| 5,226,866 | A | 7/1993 | Engel et al. |
| 5,244,446 | A | 9/1993 | Engel et al. |
| 5,247,853 | A | 9/1993 | Dalebout |
| 5,259,611 | A | 11/1993 | Dalebout et al. |
| D342,106 | S | 12/1993 | Campbell et al. |
| 5,279,528 | A | 1/1994 | Dalebout et al. |
| D344,112 | S | 2/1994 | Smith |
| D344,557 | S | 2/1994 | Ashby |
| 5,282,776 | A | 2/1994 | Dalebout |
| 5,295,931 | A | 3/1994 | Dreibelbis et al. |
| 5,302,161 | A | 4/1994 | Loubert et al. |
| D347,251 | S | 5/1994 | Dreibelbis et al. |
| 5,316,534 | A | 5/1994 | Dalebout et al. |
| D348,493 | S | 7/1994 | Ashby |
| D348,494 | S | 7/1994 | Ashby |
| 5,328,164 | A | 7/1994 | Soga |
| D349,931 | S | 8/1994 | Bostic et al. |
| 5,336,142 | A | 8/1994 | Dalebout et al. |
| 5,344,376 | A | 9/1994 | Bostic et al. |
| D351,202 | S | 10/1994 | Bingham |
| D351,435 | S | 10/1994 | Peterson et al. |
| D351,633 | S | 10/1994 | Bingham |
| D352,534 | S | 11/1994 | Dreibelbis et al. |
| D353,422 | S | 12/1994 | Bostic et al. |
| 5,372,559 | A | 12/1994 | Dalebout et al. |
| 5,374,228 | A | 12/1994 | Buisman et al. |
| 5,382,221 | A | 1/1995 | Hsu et al. |
| 5,387,168 | A | 2/1995 | Bostic |
| 5,393,690 | A | 2/1995 | Fu et al. |
| D356,128 | S | 3/1995 | Smith et al. |
| 5,409,435 | A | 4/1995 | Daniels |
| 5,429,563 | A | 7/1995 | Engel et al. |
| 5,431,612 | A | 7/1995 | Holden |
| D360,915 | S | 8/1995 | Bostic et al. |
| 5,468,205 | A | 11/1995 | McFall et al. |
| 5,489,249 | A | 2/1996 | Brewer et al. |
| 5,492,517 | A | 2/1996 | Bostic et al. |
| D367,689 | S | 3/1996 | Wilkinson et al. |
| 5,511,740 | A | 4/1996 | Loubert et al. |
| 5,512,025 | A | 4/1996 | Dalebout et al. |
| D370,949 | S | 6/1996 | Furner |
| D371,176 | S | 6/1996 | Furner |
| 5,527,245 | A | 6/1996 | Dalebout et al. |
| 5,529,553 | A | 6/1996 | Finlayson |
| 5,540,429 | A | 7/1996 | Dalebout et al. |
| 5,549,533 | A | 8/1996 | Olson et al. |
| 5,554,085 | A | 9/1996 | Dalebout |
| 5,569,128 | A | 10/1996 | Dalebout |
| 5,591,105 | A | 1/1997 | Dalebout et al. |
| 5,591,106 | A | 1/1997 | Dalebout et al. |
| 5,595,556 | A | 1/1997 | Dalebout et al. |
| 5,607,375 | A | 3/1997 | Dalebout et al. |
| 5,611,539 | A | 3/1997 | Watterson et al. |
| 5,622,527 | A | 4/1997 | Watterson et al. |
| 5,626,538 | A | 5/1997 | Dalebout et al. |
| 5,626,542 | A | 5/1997 | Dalebout et al. |
| D380,024 | S | 6/1997 | Novak et al. |
| 5,637,059 | A | 6/1997 | Dalebout |
| D380,509 | S | 7/1997 | Wilkinson et al. |
| 5,643,153 | A | 7/1997 | Nylen et al. |
| 5,645,509 | A | 7/1997 | Brewer et al. |
| D384,118 | S | 9/1997 | Deblauw |
| 5,662,557 | A | 9/1997 | Watterson et al. |
| 5,669,857 | A | 9/1997 | Watterson et al. |
| 5,672,140 | A | 9/1997 | Watterson et al. |
| 5,674,156 | A | 10/1997 | Watterson et al. |
| 5,674,453 | A | 10/1997 | Watterson et al. |
| 5,676,624 | A | 10/1997 | Watterson et al. |
| 5,683,331 | A | 11/1997 | Dalebout |
| 5,683,332 | A | 11/1997 | Watterson et al. |
| D387,825 | S | 12/1997 | Fleck et al. |
| 5,695,433 | A | 12/1997 | Buisman |
| 5,695,434 | A | 12/1997 | Dalebout et al. |
| 5,695,435 | A | 12/1997 | Dalebout et al. |
| 5,702,325 | A | 12/1997 | Watterson et al. |

(56)             References Cited

U.S. PATENT DOCUMENTS

| | | | |
|---|---|---|---|
| 5,704,879 A | 1/1998 | Watterson et al. |
| 5,718,657 A | 2/1998 | Dalebout et al. |
| 5,720,200 A | 2/1998 | Anderson et al. |
| 5,720,698 A | 2/1998 | Dalebout et al. |
| D392,006 S | 3/1998 | Dalebout et al. |
| 5,722,922 A | 3/1998 | Watterson et al. |
| 5,733,229 A | 3/1998 | Dalebout et al. |
| 5,743,833 A | 4/1998 | Watterson et al. |
| 5,762,584 A | 6/1998 | Daniels |
| 5,762,587 A | 6/1998 | Dalebout et al. |
| 5,772,560 A | 6/1998 | Watterson et al. |
| 5,810,698 A | 9/1998 | Hullett et al. |
| 5,827,155 A | 10/1998 | Jensen et al. |
| 5,830,114 A | 11/1998 | Halfen et al. |
| 5,860,893 A | 1/1999 | Watterson et al. |
| 5,860,894 A | 1/1999 | Dalebout et al. |
| 5,899,834 A | 5/1999 | Dalebout et al. |
| D412,953 S | 8/1999 | Armstrong |
| D413,948 S | 9/1999 | Dalebout |
| 5,951,441 A | 9/1999 | Dalebout et al. |
| 5,951,448 A | 9/1999 | Bolland |
| D416,596 S | 11/1999 | Armstrong |
| 6,003,166 A | 12/1999 | Hald et al. |
| 6,019,710 A | 2/2000 | Dalebout et al. |
| 6,027,429 A | 2/2000 | Daniels |
| 6,033,347 A | 3/2000 | Dalebout et al. |
| D425,940 S | 5/2000 | Halfen et al. |
| 6,059,692 A | 5/2000 | Hickman |
| D428,949 S | 8/2000 | Simonson |
| 6,123,646 A | 9/2000 | Colassi |
| 6,171,217 B1 | 1/2001 | Cutler |
| 6,171,219 B1 | 1/2001 | Simonson |
| 6,174,267 B1 | 1/2001 | Dalebout et al. |
| 6,193,631 B1 | 2/2001 | Hickman |
| 6,228,003 B1 | 5/2001 | Hald et al. |
| 6,238,323 B1 | 5/2001 | Simonson |
| 6,251,052 B1 | 6/2001 | Simonson |
| 6,261,022 B1 | 7/2001 | Dalebout et al. |
| 6,280,362 B1 | 8/2001 | Dalebout et al. |
| 6,296,594 B1 | 10/2001 | Simonson |
| D450,872 S | 11/2001 | Dalebout et al. |
| 6,312,363 B1 | 11/2001 | Watterson et al. |
| D452,338 S | 12/2001 | Dalebout et al. |
| D453,543 S | 2/2002 | Cutler |
| D453,948 S | 2/2002 | Cutler |
| 6,350,218 B1 | 2/2002 | Dalebout et al. |
| 6,387,020 B1 | 5/2002 | Simonson |
| 6,413,191 B1 | 7/2002 | Harris et al. |
| 6,422,980 B1 | 7/2002 | Simonson |
| 6,447,424 B1 | 9/2002 | Ashby et al. |
| 6,458,060 B1 | 10/2002 | Watterson et al. |
| 6,458,061 B2 | 10/2002 | Simonson |
| 6,471,622 B1 | 10/2002 | Hammer et al. |
| 6,563,225 B2 | 5/2003 | Soga et al. |
| 6,601,016 B1 | 7/2003 | Brown et al. |
| 6,623,140 B2 | 9/2003 | Watterson et al. |
| 6,626,799 B2 | 9/2003 | Watterson et al. |
| 6,652,424 B2 | 11/2003 | Dalebout |
| 6,685,607 B1 | 2/2004 | Olson |
| 6,695,581 B2 | 2/2004 | Wasson et al. |
| 6,701,271 B2 | 3/2004 | Willner et al. |
| 6,702,719 B1 | 3/2004 | Brown et al. |
| 6,712,740 B2 | 3/2004 | Simonson |
| 6,730,002 B2 | 5/2004 | Hald et al. |
| 6,743,153 B2 | 6/2004 | Watterson et al. |
| 6,746,371 B1 | 6/2004 | Brown et al. |
| 6,749,537 B1 | 6/2004 | Hickman |
| 6,761,667 B1 | 7/2004 | Cutler et al. |
| 6,770,015 B2 | 8/2004 | Simonson |
| 6,786,852 B2 | 9/2004 | Watterson et al. |
| 6,808,472 B1 | 10/2004 | Hickman |
| 6,821,230 B2 | 11/2004 | Dalebout et al. |
| 6,830,540 B2 | 12/2004 | Watterson et al. |
| 6,863,641 B1 | 3/2005 | Brown et al. |
| 6,866,613 B1 | 3/2005 | Brown et al. |
| 6,875,160 B2 | 4/2005 | Watterson et al. |
| D507,311 S | 7/2005 | Butler et al. |
| 6,918,858 B2 | 7/2005 | Watterson et al. |
| 6,921,351 B1 | 7/2005 | Hickman et al. |
| 6,974,404 B1 | 12/2005 | Watterson et al. |
| 6,997,852 B2 | 2/2006 | Watterson et al. |
| 7,025,713 B2 | 4/2006 | Dalebout et al. |
| D520,085 S | 5/2006 | Willardson et al. |
| 7,044,897 B2 | 5/2006 | Myers et al. |
| 7,052,442 B2 | 5/2006 | Watterson et al. |
| 7,060,006 B1 | 6/2006 | Watterson et al. |
| 7,060,008 B2 | 6/2006 | Watterson et al. |
| 7,070,539 B2 | 7/2006 | Brown et al. |
| 7,097,588 B2 | 8/2006 | Watterson et al. |
| D527,776 S | 9/2006 | Willardson et al. |
| 7,112,168 B2 | 9/2006 | Dalebout et al. |
| 7,128,693 B2 | 10/2006 | Brown et al. |
| 7,166,062 B1 | 1/2007 | Watterson et al. |
| 7,166,064 B2 | 1/2007 | Watterson et al. |
| 7,169,087 B2 | 1/2007 | Ercanbrack et al. |
| 7,169,093 B2 | 1/2007 | Simonson et al. |
| 7,192,388 B2 | 3/2007 | Dalebout et al. |
| 7,250,022 B2 | 7/2007 | Dalebout et al. |
| 7,282,016 B2 | 10/2007 | Simonson |
| 7,285,075 B2 | 10/2007 | Cutler et al. |
| 7,344,481 B2 | 3/2008 | Watterson et al. |
| 7,377,882 B2 | 5/2008 | Watterson et al. |
| 7,425,188 B2 | 9/2008 | Ercanbrack et al. |
| 7,429,236 B2 | 9/2008 | Dalebout et al. |
| 7,455,622 B2 | 11/2008 | Watterson et al. |
| 7,482,050 B2 | 1/2009 | Olson |
| D588,655 S | 3/2009 | Utykanski |
| 7,510,509 B2 | 3/2009 | Hickman |
| 7,537,546 B2 | 5/2009 | Watterson et al. |
| 7,537,549 B2 | 5/2009 | Nelson et al. |
| 7,537,552 B2 | 5/2009 | Dalebout et al. |
| 7,540,828 B2 | 6/2009 | Watterson et al. |
| 7,549,947 B2 | 6/2009 | Hickman et al. |
| 7,556,590 B2 | 7/2009 | Watterson et al. |
| 7,563,203 B2 | 7/2009 | Dalebout et al. |
| 7,575,536 B1 | 8/2009 | Hickman |
| 7,601,105 B1 | 10/2009 | Gipson et al. |
| 7,604,573 B2 | 10/2009 | Dalebout et al. |
| D604,373 S | 11/2009 | Dalebout et al. |
| 7,618,350 B2 | 11/2009 | Dalebout et al. |
| 7,618,357 B2 | 11/2009 | Dalebout et al. |
| 7,625,315 B2 | 12/2009 | Hickman |
| 7,625,321 B2 | 12/2009 | Simonson et al. |
| 7,628,730 B1 | 12/2009 | Watterson et al. |
| 7,628,737 B2 | 12/2009 | Kowallis et al. |
| 7,637,847 B1 | 12/2009 | Hickman |
| 7,645,212 B2 | 1/2010 | Ashby et al. |
| 7,645,213 B2 | 1/2010 | Watterson et al. |
| 7,658,698 B2 | 2/2010 | Pacheco et al. |
| 7,674,205 B2 | 3/2010 | Dalebout et al. |
| 7,693,584 B2 | 4/2010 | Pryor et al. |
| 7,713,171 B1 | 5/2010 | Hickman |
| 7,713,172 B2 | 5/2010 | Watterson et al. |
| 7,713,180 B2 | 5/2010 | Wickens et al. |
| 7,717,828 B2 | 5/2010 | Simonson et al. |
| 7,736,279 B2 | 6/2010 | Dalebout et al. |
| 7,740,563 B2 | 6/2010 | Dalebout et al. |
| 7,749,144 B2 | 7/2010 | Hammer |
| 7,766,797 B2 | 8/2010 | Dalebout et al. |
| 7,771,329 B2 | 8/2010 | Dalebout et al. |
| 7,775,940 B2 | 8/2010 | Dalebout et al. |
| 7,789,800 B1 | 9/2010 | Watterson et al. |
| 7,798,946 B2 | 9/2010 | Dalebout et al. |
| 7,815,550 B2 | 10/2010 | Watterson et al. |
| 7,857,731 B2 | 12/2010 | Hickman et al. |
| 7,862,475 B2 | 1/2011 | Watterson et al. |
| 7,862,478 B2 | 1/2011 | Watterson et al. |
| 7,862,483 B2 | 1/2011 | Hendrickson et al. |
| D635,207 S | 3/2011 | Dalebout et al. |
| 7,901,330 B2 | 3/2011 | Dalebout et al. |
| 7,909,740 B2 | 3/2011 | Dalebout et al. |
| 7,980,996 B2 | 7/2011 | Hickman |
| 7,981,000 B2 | 7/2011 | Watterson et al. |
| 7,985,164 B2 | 7/2011 | Ashby |

(56)                  References Cited

U.S. PATENT DOCUMENTS

| | | | |
|---|---|---|---|
| 8,029,415 B2 | 10/2011 | Ashby et al. |
| 8,033,960 B1 | 10/2011 | Dalebout et al. |
| D650,451 S | 12/2011 | Olson et al. |
| D652,877 S | 1/2012 | Dalebout et al. |
| 8,152,702 B2 | 4/2012 | Pacheco |
| D659,775 S | 5/2012 | Olson et al. |
| D659,777 S | 5/2012 | Watterson et al. |
| D660,383 S | 5/2012 | Watterson et al. |
| D664,613 S | 7/2012 | Dalebout et al. |
| 8,251,874 B2 | 8/2012 | Ashby et al. |
| 8,287,434 B2 | 10/2012 | Zavadsky et al. |
| 8,298,123 B2 | 10/2012 | Hickman |
| 8,298,125 B2 | 10/2012 | Colledge et al. |
| D671,177 S | 11/2012 | Sip |
| D671,178 S | 11/2012 | Sip |
| D673,626 S | 1/2013 | Olson et al. |
| 8,622,832 B2 | 1/2014 | Marty et al. |
| 8,690,735 B2 | 4/2014 | Watterson et al. |
| D707,763 S | 6/2014 | Cutler |
| 8,740,753 B2 | 6/2014 | Olson et al. |
| 8,758,201 B2 | 6/2014 | Ashby et al. |
| 8,771,153 B2 | 7/2014 | Dalebout et al. |
| 8,784,270 B2 | 7/2014 | Ashby et al. |
| 8,808,148 B2 | 8/2014 | Watterson et al. |
| 8,814,762 B2 | 8/2014 | Butler et al. |
| D712,493 S | 9/2014 | Ercanbrack et al. |
| 8,840,075 B2 | 9/2014 | Dalebout et al. |
| 8,845,493 B2 | 9/2014 | Watterson et al. |
| 8,870,726 B2 | 10/2014 | Watterson et al. |
| 8,876,668 B2 | 11/2014 | Hendrickson et al. |
| 8,894,549 B2 | 11/2014 | Colledge |
| 8,894,555 B2 | 11/2014 | Colledge et al. |
| 8,911,330 B2 | 12/2014 | Watterson et al. |
| 8,920,288 B2 | 12/2014 | Dalebout et al. |
| 8,986,165 B2 | 3/2015 | Ashby |
| 8,992,364 B2 | 3/2015 | Law et al. |
| 8,992,387 B2 | 3/2015 | Watterson et al. |
| D726,476 S | 4/2015 | Ercanbrack |
| 9,028,368 B2 | 5/2015 | Ashby et al. |
| 9,028,370 B2 | 5/2015 | Watterson et al. |
| 9,039,578 B2 | 5/2015 | Dalebout |
| D731,011 S | 6/2015 | Buchanan |
| 9,072,930 B2 | 7/2015 | Ashby et al. |
| 9,119,983 B2 | 9/2015 | Rhea |
| 9,123,317 B2 | 9/2015 | Watterson et al. |
| 9,126,071 B2 | 9/2015 | Smith |
| 9,126,072 B2 | 9/2015 | Watterson |
| 9,138,615 B2 | 9/2015 | Olson et al. |
| 9,142,139 B2 | 9/2015 | Watterson et al. |
| 9,144,703 B2 | 9/2015 | Dalebout et al. |
| 9,149,683 B2 | 10/2015 | Watterson et al. |
| 9,186,535 B2 | 11/2015 | Ercanbrack |
| 9,186,549 B2 | 11/2015 | Watterson et al. |
| 9,254,409 B2 | 2/2016 | Dalebout et al. |
| 9,254,416 B2 | 2/2016 | Ashby |
| 9,278,248 B2 | 3/2016 | Tyger et al. |
| 9,278,249 B2 | 3/2016 | Watterson |
| 9,278,250 B2 | 3/2016 | Buchanan |
| 9,289,648 B2 | 3/2016 | Watterson |
| 9,339,691 B2 | 5/2016 | Brammer |
| 9,352,185 B2 | 5/2016 | Hendrickson et al. |
| 9,352,186 B2 | 5/2016 | Watterson |
| 9,375,605 B2 | 6/2016 | Tyger et al. |
| 9,381,394 B2 | 7/2016 | Mortensen et al. |
| 9,387,387 B2 | 7/2016 | Dalebout |
| 9,393,453 B2 | 7/2016 | Watterson |
| 9,403,047 B2 | 8/2016 | Olson et al. |
| 9,403,051 B2 | 8/2016 | Cutler |
| 9,421,416 B2 | 8/2016 | Mortensen et al. |
| 9,457,219 B2 | 10/2016 | Smith |
| 9,457,220 B2 | 10/2016 | Olson |
| 9,457,222 B2 | 10/2016 | Dalebout |
| 9,460,632 B2 | 10/2016 | Watterson |
| 9,463,356 B2 | 10/2016 | Rhea |
| 9,468,794 B2 | 10/2016 | Barton |
| 9,468,798 B2 | 10/2016 | Dalebout |
| 9,480,874 B2 | 11/2016 | Cutler |
| 9,492,704 B2 | 11/2016 | Mortensen et al. |
| 9,498,668 B2 | 11/2016 | Smith |
| 9,517,378 B2 | 12/2016 | Ashby et al. |
| 9,521,901 B2 | 12/2016 | Dalebout |
| 9,533,187 B2 | 1/2017 | Dalebout |
| 9,539,461 B2 | 1/2017 | Ercanbrack |
| 9,579,544 B2 | 2/2017 | Watterson |
| 9,586,086 B2 | 3/2017 | Dalebout et al. |
| 9,586,090 B2 | 3/2017 | Watterson et al. |
| 9,604,099 B2 | 3/2017 | Taylor |
| 9,616,276 B2 | 4/2017 | Dalebout et al. |
| 9,616,278 B2 | 4/2017 | Olson |
| 9,623,281 B2 | 4/2017 | Hendrickson et al. |
| 9,636,567 B2 | 5/2017 | Brammer et al. |
| 9,675,839 B2 | 6/2017 | Dalebout et al. |
| 9,682,307 B2 | 6/2017 | Dalebout |
| 9,694,234 B2 | 7/2017 | Dalebout et al. |
| 9,694,242 B2 | 7/2017 | Ashby et al. |
| 9,737,755 B2 | 8/2017 | Dalebout |
| 9,757,605 B2 | 9/2017 | Olson et al. |
| 9,764,186 B2 | 9/2017 | Dalebout et al. |
| 9,767,785 B2 | 9/2017 | Ashby et al. |
| 9,795,822 B2 | 10/2017 | Smith et al. |
| 9,808,672 B2 | 11/2017 | Dalebout |
| 9,849,326 B2 | 12/2017 | Smith |
| 9,878,210 B2 | 1/2018 | Watterson |
| 9,889,334 B2 | 2/2018 | Ashby et al. |
| 9,889,339 B2 | 2/2018 | Douglass |
| 9,937,376 B2 | 4/2018 | McInelly et al. |
| 9,937,377 B2 | 4/2018 | McInelly et al. |
| 9,937,378 B2 | 4/2018 | Dalebout et al. |
| 9,937,379 B2 | 4/2018 | Mortensen et al. |
| 9,943,719 B2 | 4/2018 | Smith et al. |
| 9,943,722 B2 | 4/2018 | Dalebout |
| 9,948,037 B2 | 4/2018 | Ashby |
| 9,968,816 B2 | 5/2018 | Olson et al. |
| 9,968,821 B2 | 5/2018 | Finlayson et al. |
| 9,968,823 B2 | 5/2018 | Cutler |
| 10,010,755 B2 | 7/2018 | Watterson |
| 10,010,756 B2 | 7/2018 | Watterson |
| 10,029,145 B2 | 7/2018 | Douglass |
| D826,350 S | 8/2018 | Hochstrasser |
| 10,046,196 B2 | 8/2018 | Ercanbrack et al. |
| D827,733 S | 9/2018 | Hochstrasser |
| 10,065,064 B2 | 9/2018 | Smith et al. |
| 10,071,285 B2 | 9/2018 | Smith et al. |
| 10,085,586 B2 | 10/2018 | Smith et al. |
| 10,086,254 B2 | 10/2018 | Watterson |
| 10,136,842 B2 | 11/2018 | Ashby |
| 10,186,161 B2 | 1/2019 | Watterson |
| 10,188,890 B2 | 1/2019 | Olson et al. |
| 10,207,143 B2 | 2/2019 | Dalebout et al. |
| 10,207,145 B2 | 2/2019 | Tyger et al. |
| 10,207,147 B2 | 2/2019 | Ercanbrack et al. |
| 10,207,148 B2 | 2/2019 | Powell et al. |
| 10,212,994 B2 | 2/2019 | Watterson et al. |
| 10,220,259 B2 | 3/2019 | Brammer |
| 10,226,396 B2 | 3/2019 | Ashby |
| 10,226,664 B2 | 3/2019 | Dalebout et al. |
| 10,252,109 B2 | 4/2019 | Watterson |
| 10,258,828 B2 | 4/2019 | Dalebout et al. |
| 10,272,317 B2 | 4/2019 | Watterson |
| 10,279,212 B2 | 5/2019 | Dalebout et al. |
| 10,293,211 B2 | 5/2019 | Watterson et al. |
| D852,292 S | 6/2019 | Cutler |
| 10,343,017 B2 | 7/2019 | Jackson |
| 10,376,736 B2 | 8/2019 | Powell et al. |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby et al. |
| 10,441,840 B2 | 10/2019 | Dalebout |
| 10,441,844 B2 | 10/2019 | Powell |
| 10,449,416 B2 | 10/2019 | Dalebout et al. |
| 10,471,299 B2 | 11/2019 | Powell |

(56)  References Cited

U.S. PATENT DOCUMENTS

| D868,909 | S | 12/2019 | Cutler et al. |
| 10,492,519 | B2 | 12/2019 | Capell et al. |
| 10,493,349 | B2 | 12/2019 | Watterson |
| 10,500,473 | B2 | 12/2019 | Watterson |
| 10,537,764 | B2 | 1/2020 | Smith et al. |
| 10,543,395 | B2 | 1/2020 | Powell et al. |
| 10,561,877 | B2 | 2/2020 | Workman |
| 10,561,893 | B2 | 2/2020 | Chatterton et al. |
| 10,561,894 | B2 | 2/2020 | Dalebout et al. |
| 10,569,121 | B2 | 2/2020 | Watterson |
| 10,569,123 | B2 | 2/2020 | Hochstrasser et al. |
| 10,625,114 | B2 | 4/2020 | Ercanbrack |
| 10,625,137 | B2 | 4/2020 | Dalebout et al. |
| 10,661,114 | B2 | 5/2020 | Watterson et al. |
| 10,668,320 | B2 | 6/2020 | Watterson |
| 10,671,705 | B2 | 6/2020 | Capell et al. |
| 10,688,346 | B2 | 6/2020 | Brammer |
| 10,702,736 | B2 | 7/2020 | Weston et al. |
| 10,709,925 | B2 | 7/2020 | Dalebout et al. |
| 10,726,730 | B2 | 7/2020 | Watterson |
| 10,729,965 | B2 | 8/2020 | Powell |
| 10,758,767 | B2 | 9/2020 | Olson et al. |
| 10,786,706 | B2 | 9/2020 | Smith |
| 10,864,407 | B2 | 12/2020 | Watterson et al. |
| 10,918,905 | B2 | 2/2021 | Powell et al. |
| 10,932,517 | B2 | 3/2021 | Ashby et al. |
| 10,940,360 | B2 | 3/2021 | Dalebout et al. |
| 10,953,268 | B1 | 3/2021 | Dalebout et al. |
| 10,953,305 | B2 | 3/2021 | Dalebout et al. |
| 10,967,214 | B1 | 4/2021 | Olson et al. |
| 10,994,173 | B2 | 5/2021 | Watterson |
| 11,000,730 | B2 | 5/2021 | Dalebout et al. |
| 11,013,960 | B2 | 5/2021 | Watterson et al. |
| 11,033,777 | B1 | 6/2021 | Watterson et al. |
| 11,058,913 | B2 | 7/2021 | Dalebout et al. |
| 11,058,914 | B2 | 7/2021 | Powell |
| 11,058,918 | B1 | 7/2021 | Watterson et al. |
| 11,187,285 | B2 | 11/2021 | Wrobel |
| 11,298,577 | B2 | 4/2022 | Watterson |
| 11,326,673 | B2 | 5/2022 | Buchanan |
| 11,338,169 | B2 | 5/2022 | Dalebout et al. |
| 11,338,175 | B2 | 5/2022 | Watterson et al. |
| 11,426,633 | B2 | 8/2022 | Watterson et al. |
| 11,451,108 | B2 | 9/2022 | Tinney |
| 11,452,903 | B2 | 9/2022 | Watterson |
| 11,511,152 | B2 | 11/2022 | Powell et al. |
| 11,534,651 | B2 | 12/2022 | Ercanbrack et al. |
| 11,534,654 | B2 | 12/2022 | Silcock et al. |
| 11,534,655 | B2 | 12/2022 | Dalebout et al. |
| 11,565,148 | B2 | 1/2023 | Dalebout et al. |
| 11,596,830 | B2 | 3/2023 | Dalebout et al. |
| 11,642,564 | B2 | 5/2023 | Watterson |
| 11,673,036 | B2 | 6/2023 | Dalebout et al. |
| 11,680,611 | B2 | 6/2023 | Wrobel |
| 11,700,905 | B2 | 7/2023 | Ashby et al. |
| 11,708,874 | B2 | 7/2023 | Wrobel |
| 2007/0146484 | A1 | 6/2007 | Horton et al. |
| 2008/0051256 | A1 | 2/2008 | Ashby et al. |
| 2015/0009149 | A1* | 1/2015 | Gharib .................... G06F 3/011 |
| | | | 345/156 |
| 2015/0251055 | A1 | 9/2015 | Ashby |
| 2016/0058335 | A1 | 3/2016 | Ashby |
| 2016/0346595 | A1 | 12/2016 | Dalebout et al. |
| 2017/0124912 | A1 | 5/2017 | Ashby et al. |
| 2017/0193578 | A1 | 7/2017 | Watterson |
| 2017/0266489 | A1 | 9/2017 | Douglass et al. |
| 2017/0270820 | A1 | 9/2017 | Ashby et al. |
| 2017/0368413 | A1 | 12/2017 | Shavit |
| 2018/0085630 | A1 | 3/2018 | Capell et al. |
| 2018/0099116 | A1 | 4/2018 | Ashby |
| 2018/0099180 | A1 | 4/2018 | Wilkinson |
| 2018/0111034 | A1 | 4/2018 | Watterson |
| 2019/0223612 | A1 | 7/2019 | Watterson et al. |
| 2019/0269971 | A1 | 9/2019 | Capell et al. |
| 2020/0009417 | A1 | 1/2020 | Dalebout |
| 2020/0368575 | A1 | 11/2020 | Hays et al. |
| 2020/0391069 | A1 | 12/2020 | Olson et al. |
| 2021/0001177 | A1 | 1/2021 | Smith |
| 2021/0046353 | A1 | 2/2021 | Dalebout et al. |
| 2021/0106899 | A1 | 4/2021 | Willardson et al. |
| 2021/0110910 | A1 | 4/2021 | Ostler et al. |
| 2021/0146221 | A1 | 5/2021 | Dalebout et al. |
| 2021/0213331 | A1 | 7/2021 | Watterson |
| 2021/0268336 | A1 | 9/2021 | Watterson et al. |
| 2021/0291013 | A1 | 9/2021 | Nascimento |
| 2021/0299518 | A1 | 9/2021 | Brammer et al. |
| 2021/0299542 | A1 | 9/2021 | Brammer et al. |
| 2021/0339079 | A1 | 11/2021 | Dalebout et al. |
| 2022/0062685 | A1 | 3/2022 | Ashby et al. |
| 2022/0104992 | A1 | 4/2022 | Ashby |
| 2022/0139253 | A1* | 5/2022 | Chen .................... G06V 10/751 |
| | | | 434/247 |
| 2022/0198834 | A1* | 6/2022 | Fujimoto ............. G06V 10/803 |
| 2022/0212052 | A1 | 7/2022 | Ercanbrack et al. |
| 2022/0241649 | A1 | 8/2022 | Ashby |
| 2022/0241665 | A1 | 8/2022 | Dalebout et al. |
| 2022/0241668 | A1 | 8/2022 | Willardson et al. |
| 2022/0249912 | A1 | 8/2022 | Watterson et al. |
| 2022/0257994 | A1 | 8/2022 | Smith |
| 2022/0258007 | A1 | 8/2022 | Watterson et al. |
| 2022/0258008 | A1 | 8/2022 | Watterson et al. |
| 2022/0266085 | A1 | 8/2022 | Dalebout et al. |
| 2022/0280857 | A1 | 9/2022 | Watterson |
| 2022/0309042 | A1 | 9/2022 | Archer |
| 2022/0314078 | A1 | 10/2022 | Watterson et al. |
| 2022/0323827 | A1 | 10/2022 | Watterson et al. |
| 2022/0339493 | A1 | 10/2022 | Larsen |
| 2022/0339520 | A1 | 10/2022 | Toth |
| 2022/0342969 | A1 | 10/2022 | Watterson et al. |
| 2022/0347516 | A1 | 11/2022 | Taylor |
| 2022/0347548 | A1 | 11/2022 | Watterson |
| 2022/0362613 | A1 | 11/2022 | Watterson et al. |
| 2022/0362624 | A1 | 11/2022 | Dalebout |
| 2022/0395729 | A1 | 12/2022 | Toth |
| 2023/0021945 | A1* | 1/2023 | Chandrashekar ...... G16H 30/20 |
| 2023/0039903 | A1 | 2/2023 | Brammer et al. |
| 2023/0054845 | A1 | 2/2023 | Smith |
| 2023/0122235 | A1 | 4/2023 | Ashby et al. |
| 2023/0128721 | A1 | 4/2023 | Plummer |
| 2023/0158358 | A1 | 5/2023 | Ercanbrack et al. |
| 2023/0181993 | A1 | 6/2023 | Taylor et al. |
| 2023/0191189 | A1 | 6/2023 | Taylor et al. |
| 2023/0191197 | A1 | 6/2023 | Ashby |
| 2023/0218975 | A1 | 7/2023 | Toles et al. |
| 2023/0226401 | A1 | 7/2023 | Watterson |

OTHER PUBLICATIONS

U.S. Appl. No. 17/066,485, filed Oct. 9, 2020, Weston et al.
U.S. Appl. No. 17/739,819, filed May 9, 2022, Buchanan.
U.S. Appl. No. 17/841,313, filed Jun. 15, 2022, Weston et al.
U.S. Appl. No. 17/963,822, filed Oct. 11, 2022, Powell.
U.S. Appl. No. 18/091,004, filed Dec. 29, 2022, Cox.
U.S. Appl. No. 18/103,221, filed Jan. 30, 2023, Dalebout et al.
U.S. Appl. No. 18/114,758, filed Feb. 27, 2023, Cutler et al.
U.S. Appl. No. 18/117,263, filed Mar. 3, 2023, Smith et al.
U.S. Appl. No. 18/123,026, filed Mar. 17, 2023, Silcock et al.
U.S. Appl. No. 18/132,277, filed Apr. 7, 2023, Vasquez et al.
U.S. Appl. No. 18/136,535, filed Apr. 19, 2023, Ashby et al.
U.S. Appl. No. 18/205,299, filed Jun. 2, 2023, Wrobel.
U.S. Appl. No. 18/207,512, filed Jun. 8, 2023, Chuang.
U.S. Appl. No. 18/210,505, filed Jun. 15, 2023, Nielsen et al.
U.S. Appl. No. 29/702,127, filed Sep. 16, 2019, Cutler et al.
U.S. Appl. No. 62/273,852, filed Dec. 31, 2015, Watterson.
U.S. Appl. No. 63/073,081, filed Sep. 1, 2021, Ashby et al.
U.S. Appl. No. 63/079,697, filed Sep. 7, 2020, Willardson et al.
U.S. Appl. No. 63/086,793, filed Oct. 20, 2020, Ashby.
U.S. Appl. No. 63/134,036, filed Jan. 5, 2021, Ercanbrack et al.
U.S. Appl. No. 63/150,066, filed Feb. 16, 2021, Smith.
U.S. Appl. No. 63/156,801, filed Mar. 4, 2021, Watterson.
U.S. Appl. No. 63/165,498, filed Mar. 24, 2021, Archer.

(56)          References Cited

OTHER PUBLICATIONS

U.S. Appl. No. 63/179,094, filed Apr. 23, 2021, Watterson et al.
U.S. Appl. No. 63/180,521, filed Apr. 27, 2021, Watterson et al.
U.S. Appl. No. 63/187,348, filed May 11, 2021, Dalebout et al.
U.S. Appl. No. 63/188,431, filed May 13, 2021, Plummer.
U.S. Appl. No. 63/200,903, filed Apr. 2, 2021, Watterson et al.
U.S. Appl. No. 63/211,870, filed Jun. 17, 2021, Watterson et al.
U.S. Appl. No. 63/216,313, filed Jun. 29, 2021, Watterson et al.
U.S. Appl. No. 63/229,794, filed Aug. 12, 2021, Brammer.
U.S. Appl. No. 63/235,002, filed Aug. 19, 2021, Smith.
U.S. Appl. No. 63/254,470, filed Oct. 11, 2021, Powell.
U.S. Appl. No. 63/278,714, filed Nov. 12, 2021, Taylor.
U.S. Appl. No. 63/289,997, filed Dec. 15, 2021, Taylor et al.
U.S. Appl. No. 63/290,455, filed Dec. 16, 2021, Taylor et al.
U.S. Appl. No. 63/290,557, filed Dec. 16, 2021, Ashby.
U.S. Appl. No. 63/298,170, filed Jan. 10, 2022, Ercanbrack et al.
U.S. Appl. No. 63/299,357, filed Jan. 13, 2022, Toles et al.
U.S. Appl. No. 63/305,976, filed Feb. 2, 2022, Watterson.
U.S. Appl. No. 63/329,270, filed Apr. 8, 2022, Vasquez et al.
U.S. Appl. No. 63/332,581, filed Apr. 25, 2022, Ashby et al.
U.S. Appl. No. 63/338,265, filed May 4, 2022, Ashby et al.
U.S. Appl. No. 63/350,072, filed Jun. 8, 2022, Chuang.
U.S. Appl. No. 63/352,539, filed Jun. 15, 2022, Nielsen et al.
U.S. Appl. No. 63/471,680, filed Jun. 7, 2023, Powell et al.

* cited by examiner

210

214

216

210

214

216

504

610

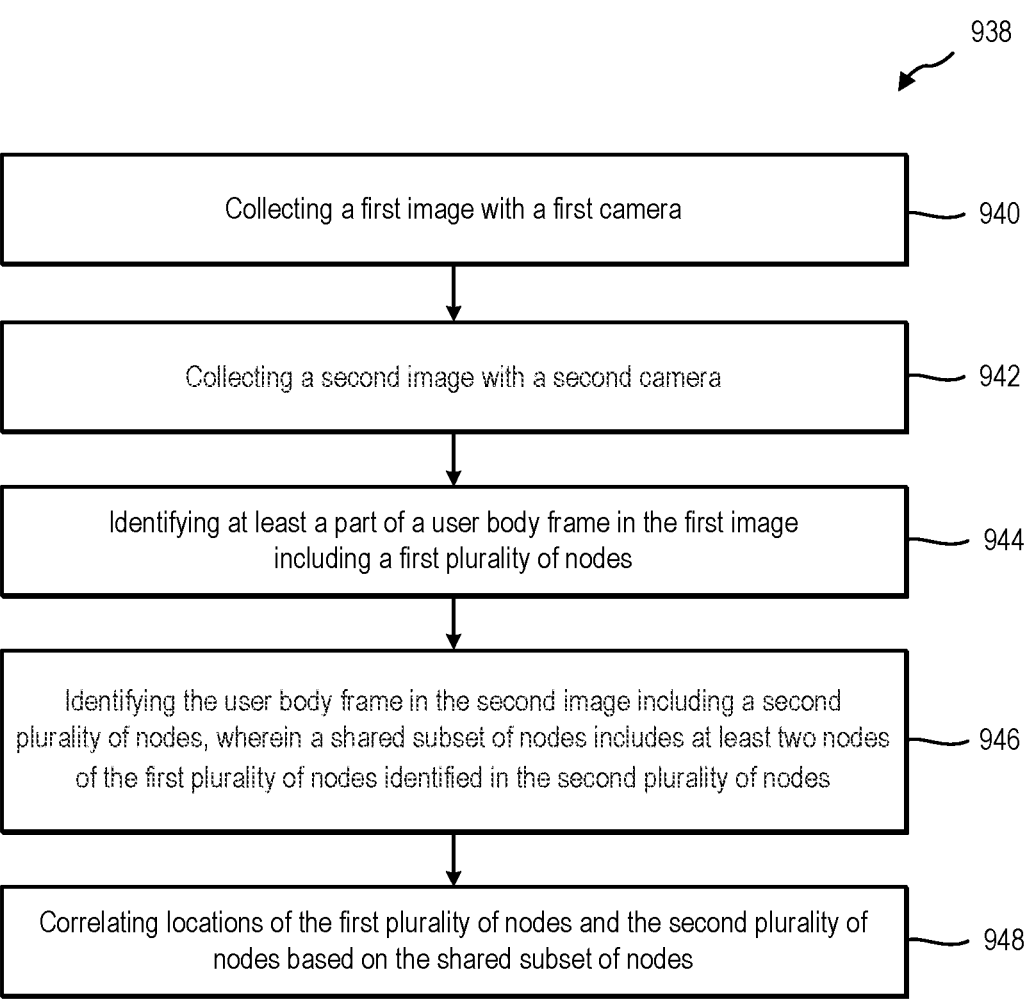

938

Collecting a first image with a first camera — 940

Collecting a second image with a second camera — 942

Identifying at least a part of a user body frame in the first image including a first plurality of nodes — 944

Identifying the user body frame in the second image including a second plurality of nodes, wherein a shared subset of nodes includes at least two nodes of the first plurality of nodes identified in the second plurality of nodes — 946

Correlating locations of the first plurality of nodes and the second plurality of nodes based on the shared subset of nodes — 948

FIG. 9

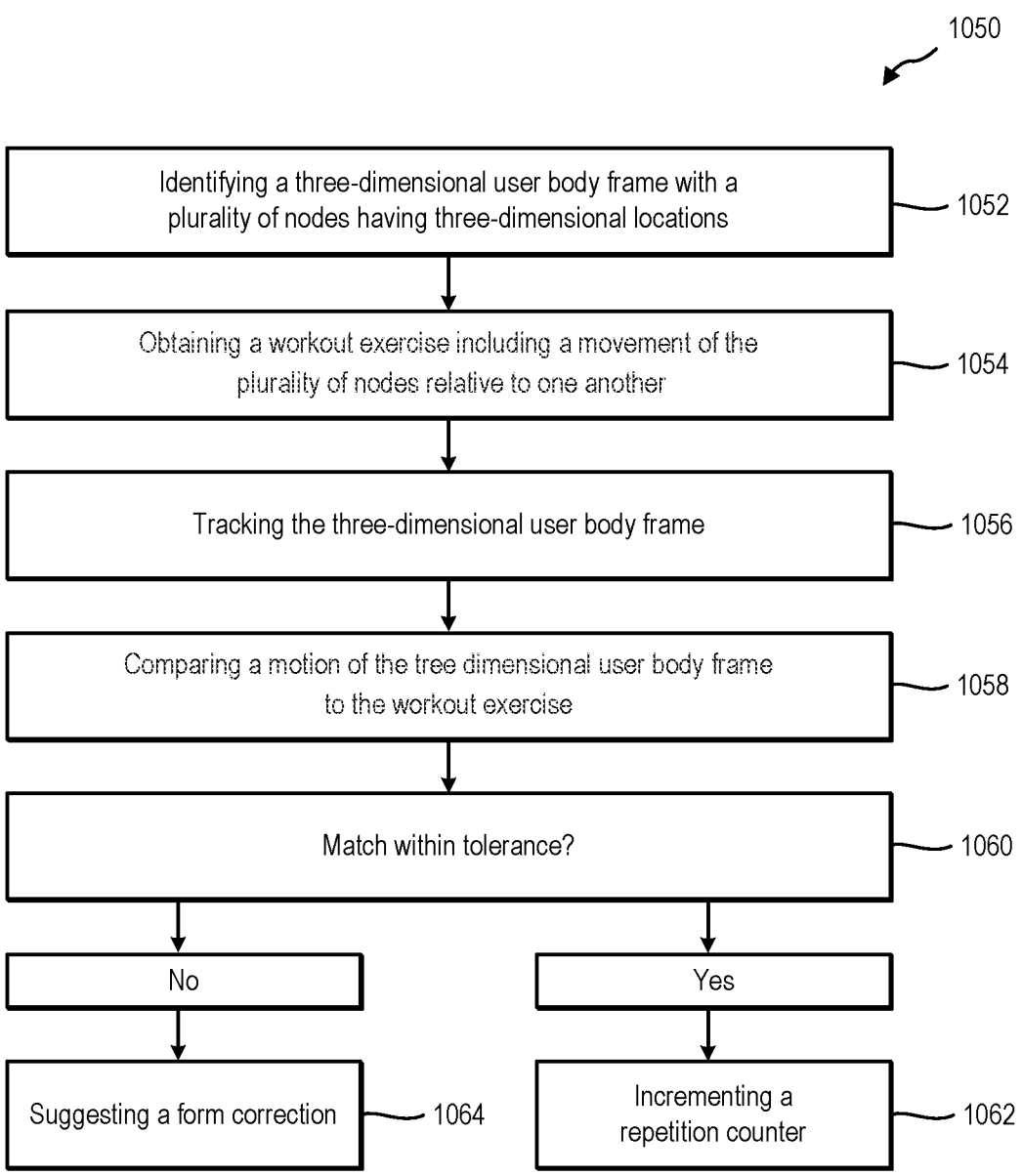

1050

Identifying a three-dimensional user body frame with a plurality of nodes having three-dimensional locations — 1052

Obtaining a workout exercise including a movement of the plurality of nodes relative to one another — 1054

Tracking the three-dimensional user body frame — 1056

Comparing a motion of the tree dimensional user body frame to the workout exercise — 1058

Match within tolerance? — 1060

No

Yes

Suggesting a form correction — 1064

Incrementing a repetition counter — 1062

FIG. 10

SYSTEMS AND METHODS FOR EXERCISE TRACKING

CROSS-REFERENCE TO RELATED APPLICATIONS

This application claims priority to and the benefit of U.S. Provisional Patent Application No. 63/338,265, filed on May 4, 2022, which is hereby incorporated by reference in its entirety.

BACKGROUND

Background and Relevant Art

Exercise devices allow for convenient exercises and workouts without requiring large amounts of space, agreeable weather or outdoor conditions, or specialized equipment. Exercise devices can also simulate a personal trainer, custom workouts, or different locations. Unlike a personal trainer, however, exercise devices have limited capacity to provide coaching, feedback, or guidance on proper form and movements.

BRIEF SUMMARY

In some embodiments, a method of exercise tracking includes collecting a first image of a first field of view (FOV) with a first camera and collecting a second image of a second FOV with a second camera. The method further includes identifying at least part of a user body frame in the first image including a first plurality of nodes and identifying at least part of the user body frame in the second image including a second plurality of nodes. A plurality of shared nodes includes at least two nodes of the first plurality of nodes identified in the second plurality of nodes. The method includes correlating locations of the first plurality of nodes and the second plurality of nodes based on the plurality of shared nodes.

In some embodiments, a system for exercise tracking includes a first camera, a second camera, and a computing device in data communication with the first camera and the second camera. The computing device includes a processor and a hardware storage device in data communication with the processor. The hardware storage device has instructions stored thereon that, when executed by the processor, cause the computing device to receive a first image from the first camera and receive a second image from the second camera. The instructions further cause the computing device to identify at least a part of a user body frame in the first image including a first plurality of nodes and identify the user body frame in the second image including a second plurality of nodes. A plurality of shared nodes includes at least two nodes of the first plurality of nodes identified in the second plurality of nodes. The instructions further cause the computing device to correlate locations of the first plurality of nodes and the second plurality of nodes based on the plurality of shared nodes.

In some embodiments, a method of exercise tracking includes identifying a three-dimensional (3D) user body frame with a plurality of nodes having 3D locations, obtaining a workout exercise including movement of the plurality of nodes relative to one another, tracking the 3D user body frame, and comparing a motion of the 3D user body frame to the workout exercise. The method further includes determining a match in the motion of the 3D user body frame to the workout exercise and, based at least partially on the match, selecting at least one of suggesting a form correction and incrementing a repetition counter.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a front view of a user performing an exercise movement, according to at least one embodiment of the present disclosure;

FIG. 2-2 is a side view of the user of FIG. 2-1 performing the exercise movement, according to at least one embodiment of the present disclosure;

FIG. 2-3 is a side view of the user of FIG. 2-1 performing a second exercise movement, according to at least one embodiment of the present disclosure;

FIG. 3 is a top view of an exercise system with an integrated display, according to at least one embodiment of the present disclosure;

FIG. 7-1 is a front view of a user body frame, according to at least one embodiment of the present disclosure;

FIG. 7-2 is a side view of the user body frame of FIG. 7-1, according to at least one embodiment of the present disclosure;

FIG. 9 is a flowchart illustrating a method of exercise tracking, according to at least one embodiment of the present disclosure; and FIG. 10 is a flowchart illustrating another method of exercise tracking, according to at least one embodiment of the present disclosure.

DETAILED DESCRIPTION

Figure 1:
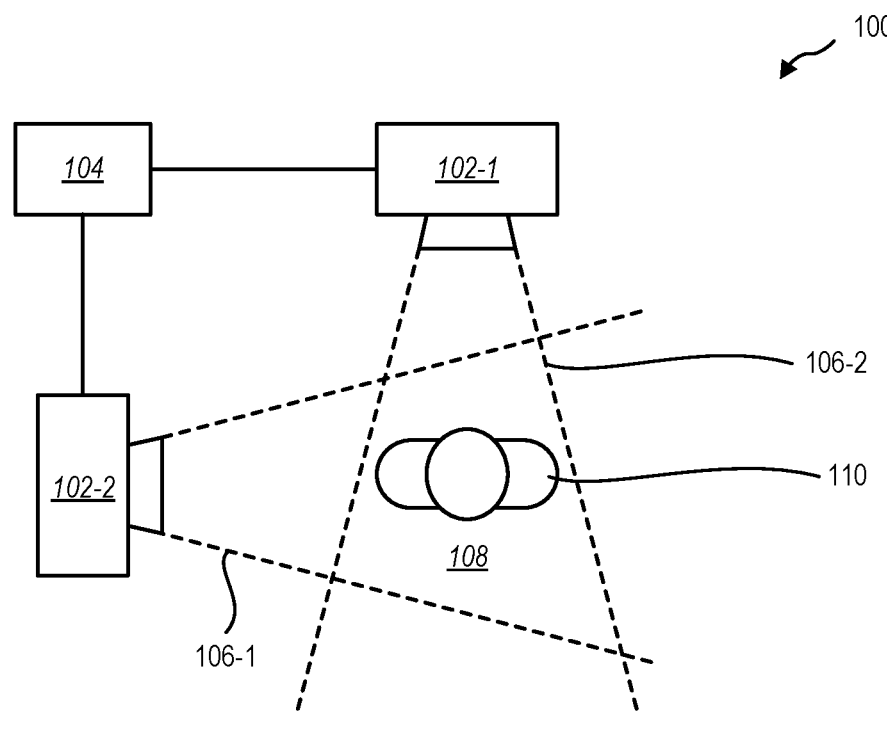
FIG. 1 is a top view of an exercise system with dual cameras, according to at least one embodiment of the present disclosure.

The present disclosure relates generally to systems and methods for tracking and providing feedback to a user during a workout exercise. More particularly, a plurality of cameras are in data communication with a computing device to image a user from at least a front view and a side view to track the user's movements during a workout exercise. In some embodiments, systems and methods according to the present disclosure allow the user to exercise more safely and more effectively without the need for a personal trainer.

Exercising in a user's own home is convenient for the user, however, little to no feedback is provided regarding the user's form, cadence, or range of motion during the exercise. To improve the fitness results and safety of exercising in the user's own home, some embodiments of the present disclosure use machine vision to track the user's body and body movements to provide real-time coaching during exercise.

In some embodiments, an exercise system includes at least two cameras in data communication with a computing device. The first camera and second camera are positioned at different locations and orientations such that a first field of view (FOV) of the first camera and a second FOV of the second camera overlap. A user can position themselves in the overlapping portion of the first FOV and the second FOV to allow the first camera and second camera to image the user from two different perspectives.

Using the two different perspectives, the system can image and track a plurality of locations on the user's body to create a body frame (e.g., a user body frame) with a plurality of nodes positioned in three-dimensional space. The body frame can be compared against one or more exercise movements, such as squats, arm lifts, bicep curls, pushups, etc. to determine the accuracy of the user's movement for the exercise movement. In some embodiments, the exercise movement is obtained from a hardware storage device stored locally on the computing device. In some embodiments, the exercise movement is obtained from a remote computing device and/or hardware storage device, such as from a server accessed via a network. In some embodiments, the exercise movement includes a model frame with a plurality of nodes that move relative to one another to simulate body movements of the exercise movement.

In some embodiments, the computing device instructs the user to perform the exercise movement via a display device and/or audio device in data communication with a processor of the computing device. For example, the computing device may have a display device and/or audio device integrated therein that demonstrates or explains the exercise movement through video or audio for the user to replicate. In some examples, the computing device may be in data communication with an external display device and/or audio device that demonstrates or explains the exercise movement through video or audio for the user to replicate.

In some embodiments, the computing device compares the body frame to the model frame of the exercise movement (e.g., compares the calculated positions of the plurality of nodes of the body frame to the expected positions of the plurality of nodes of the model frame) and provides video or audio feedback to the user when the body frame is misaligned with the model frame during the exercise movement.

In some embodiments, the exercise movement is part of a workout routine that includes a quantity of repetitions of the exercise movement. In some embodiments, the computing device may instruct the user to perform the exercise movement as part of the workout routine. The computing device may register a repetition of the exercise movement when the body frame of the user performs the exercise movement while remaining within a threshold displacement from the model frame of the exercise movement. For example, if the calculated body frame indicates that user's upper body moves in an incorrect movement during a squat exercise, the computing device may not count that movement as a repetition of the exercise movement. The computing device may, when the body frame and model frame are misaligned, provide video or audio feedback to alert the user of the misalignment and/or the non-registration of the exercise movement as a repetition.

FIG. 1 is top schematic representation of an exercise system 100 according to some embodiments of the present disclosure. An exercise system 100 includes at least a first camera 102-1 and a second camera 102-2 in data communication with a computing device 104. The first camera 102-1 has a first FOV 106-1, and the second camera 102-2 has a second FOV 106-2. The first FOV 106-1 and second FOV 106-2 overlap in an overlapping FOV 108.

FIG. 1 illustrates the overlapping FOV 108 from a top view, however, it should be understood each FOV 106-1, 106-2 and the overlapping FOV 108 defines a volume of space in three-dimensions. In some embodiments, at least a portion of a user 110 is positioned in the volume of the overlapping FOV 108 such that the first camera 102-1 and the second camera 102-2 image the portion of the user 110 within each camera's respective FOV. The different perspectives of the first FOV 106-1 and second FOV 106-2 allow the same part of the user 110 to be imaged from two different perspectives, providing a location of that part of the user 110 in three-dimensional space.

Figures 1, 2:
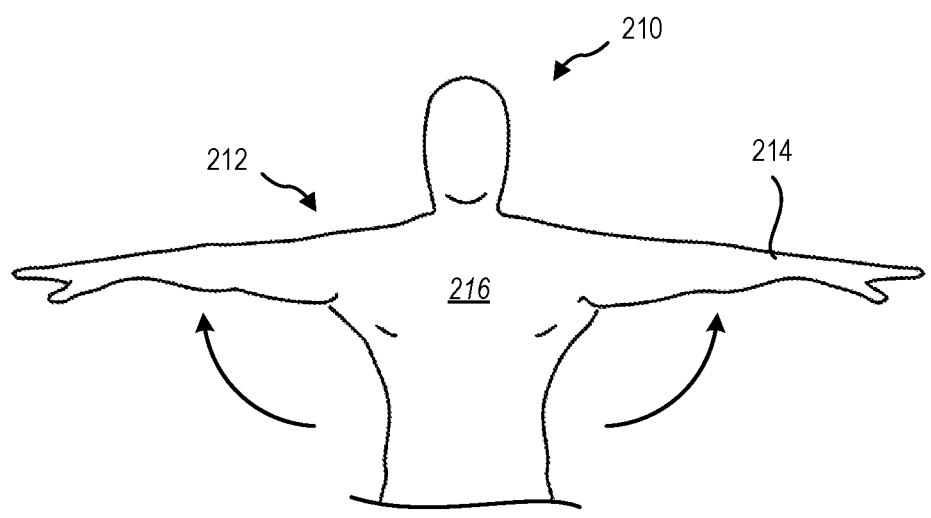
Figure 2:
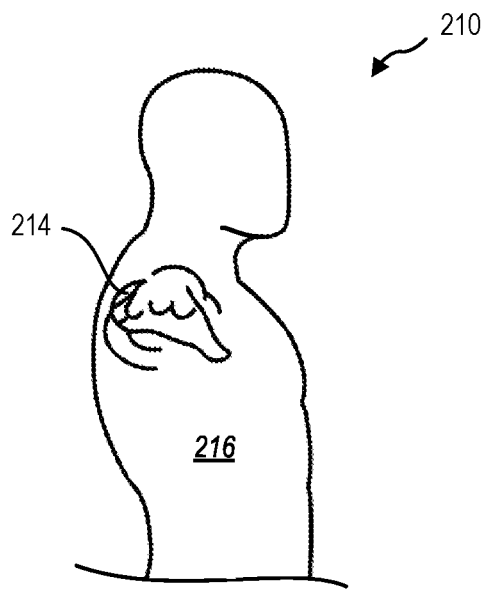
Figures 2, 3:
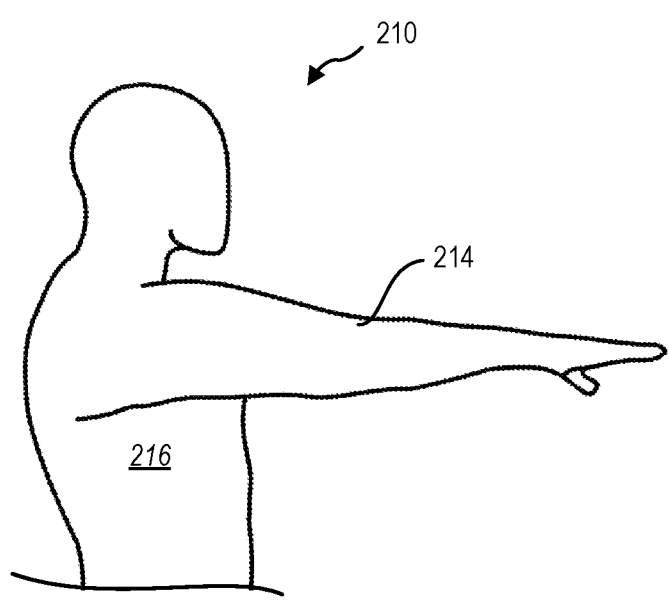
Figure 3:
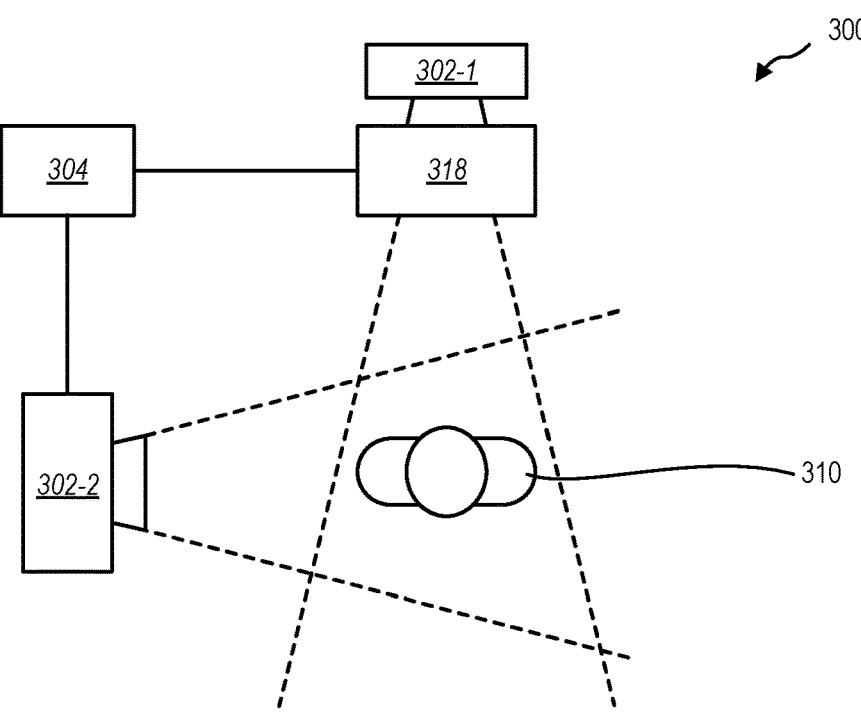

FIG. 2-1 through FIG. 2-3 illustrate a portion 212 of the user 210 (such as user 110 in FIG. 1) positioned in an overlapping FOV. FIG. 2-1 illustrates a portion 212 of the user 210 from the perspective of the first camera (e.g., first camera 102-1 of FIG. 1). The user 210 is performing an arm lift exercise and has arms 214 outstretched sideways from the upper body 216 and is holding the arms 214 approximately level to the ground. FIG. 2-2 and FIG. 2-3 illustrate an example of the user 210 imaged from the perspective of a second camera (e.g., second camera 202-2 of FIG. 1). In FIG. 2-2, the user 210 is performing the arm lift exercise with correct form, holding the arms 214 in a plane of the upper body 216 and moving the arms 214 directly outward and upward from the sides of the upper body 216.

In FIG. 2-3, the user 210 is performing the arm lift exercise with incorrect form, holding the arms 214 forward of a plane of the upper body 216 and moving the arms 214 forward (in front of the user 210) while moving the arms 214 outward and upward from the sides of the upper body 216. The muscles engaged by the movements illustrated in FIG. 2-2 and FIG. 2-3 are different, producing a different exercise movement. In each example, a first camera positioned in front of the user 210 and capturing the first FOV illustrated in FIG. 2-1 may have difficulty detecting the difference between the positions in FIG. 2-2 and FIG. 2-3. In some embodiments, a two-camera exercise system can provide improved body tracking and improved feedback to a user for a more efficient workout experience and increased safety, as poor form, posture, or movement during exercise movements can increase a risk of injury.

In some embodiments, such as illustrated in FIG. 3, an exercise system 300 includes a first camera 302-1, a second camera 302-2, and a display device 318 in data communication with a computing device 304. In some embodiments, the display device 318 and first camera 302-1 are integrated with one another. For example, the first camera 302-1 may be integrated into a bezel of the display device 318. In some examples, the first camera 302-1 may be integrated behind a portion of the display panel of the display device 318, such as integrated into a portion of the pixel array of an LED display or behind a panel of a projection display. In some embodiments, having the first camera 302-1 integrated with the display device 318 will ensure the user 310 is facing the first camera 302-1 while viewing the display device 318. In some embodiments, the display device 318 includes a reflective (e.g., mirror-like) cover panel that reflects exterior light, allowing the user to see their reflection in the cover panel, while also allowing light originating behind the cover panel, such as a backlit LED array or a self-emitting OLED array, to pass through and be emitted from the display panel. A reflective display panel can thereby provide video information to the user while the user is able to view their own reflection during a workout.

In some embodiments, the second camera 302-2 is a standalone camera that is in data communication with the computing device 314. In some embodiments, the computing device 304 is a first computing device and the second camera 302-2 is part of second computing device. In some examples, the first computing device is a laptop computer, a desktop computer, a tablet computer, a hybrid computer, a set-top computer, or other computing device that is in data communication with the display panel of the display device 318 and/or the first camera 302-1. In some examples, the first computing device may be integrated in a single housing with a display device 318 and a first camera 302-1, such as a NORDICTRACK VAULT.

Figure 4:
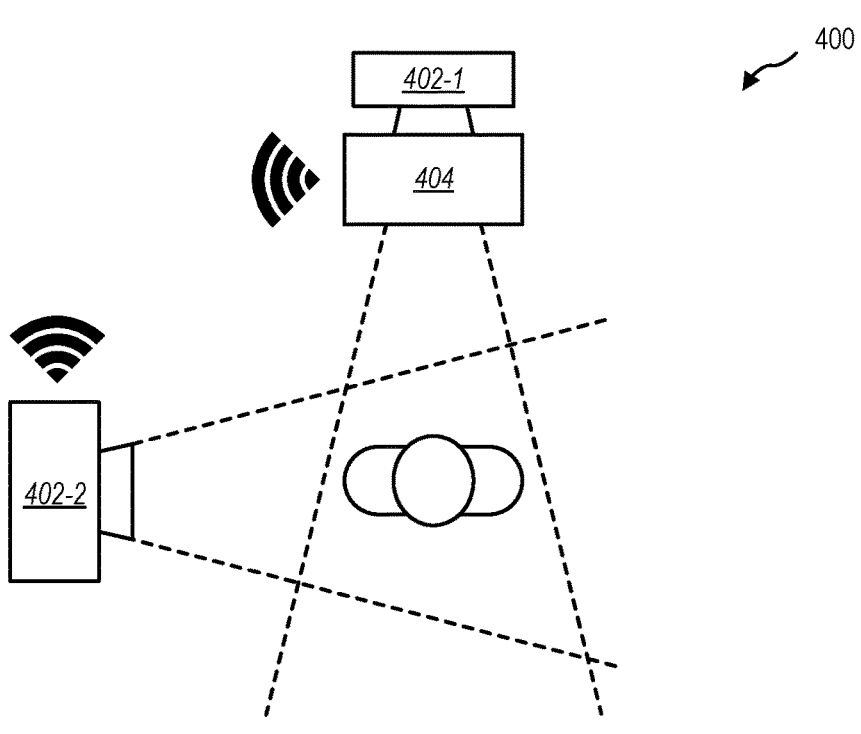
FIG. 4 is a top view of an exercise system with wireless communication, according to at least one embodiment of the present disclosure.

FIG. 4 is a top view of an exercise system 400 with a computing device 404 (including a first camera 402-1) in wireless communication with a second camera 402-2. For example, the second camera 402-2 communicates with the computing device 404 (or first camera 402-1) via one or more wireless data transmission protocol, such as Bluetooth, 802.11ax, 802.11n, or other wireless communication standards. In some embodiments, the first camera 402-1 and second camera 402-2 are in wireless data communication with one another, and the first camera 402-1 communicates the video information from both the first camera 402-1 and the second camera 402-2 to the computing device 404 (such as to a processor of the computing device 404). In some embodiments, one or both of the first camera 402-1 and second camera 402-2 are in wireless data communication with the computing device 404. For example, the first camera 402-1 may be in wired communication with the computing device 404 and communicates the video information from the first camera 402-1 to the computing device 404, while the second camera 402-2 is in wireless communication with the computing device 404 and sends the video information from the second camera 402-2 to the computing device 404 independently of the first camera 402-1. In at least one embodiment, the first camera 402-1 is integrated into the computing device 404, and the second camera 402-2 is in wireless communication with the computing device 404.

In some embodiments, the second camera 402-2 is integrated into a second computing device and the second computing device transmits video information from the second camera 402-2 to the first computing device 404. For example, the second camera 402-2 may be integrated with or in wired communication with a laptop computer, a desktop computer, a tablet computer, a hybrid computer, a set-top computer, a smartphone, or other computing device. In at least one embodiment, the user may position a smartphone to his or her side to capture a side view relative to the first camera 402-1 with a camera of the smartphone. In some examples, the smartphone may transmit video information from the camera of the smartphone to the computing device 404 via a wireless communication. This may allow the exercise system 400 to improve detection of the user and movements of the user by leveraging computing resources and a second camera that many users already have available.

Figure 5:
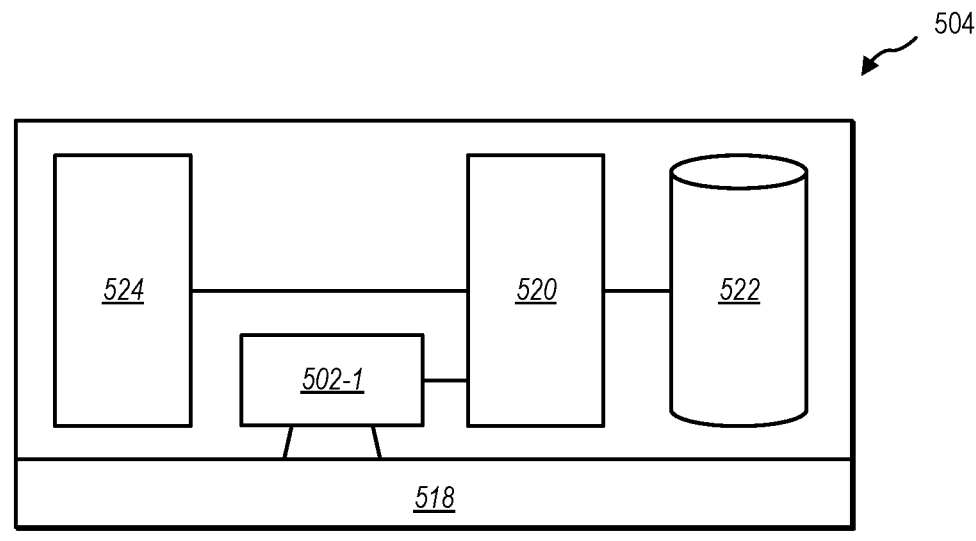
FIG. 5 is a schematic diagram of a computing device, according to at least one embodiment of the present disclosure.

FIG. 5 is a system diagram of a computing device 504 with an integrated display device 518 and a first camera 502-1. The computing device 504 includes at least a processor 520 in data communication with the display device 518 and the first camera 502-1. The processor 520 is further in data communication with a hardware storage device 522 and a communication device 524.

In some embodiments, the hardware storage device 522 is any non-transient computer readable medium that may store instructions thereon. The hardware storage device 522 may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device 522 is local to and/or integrated with the computing device. The hardware storage device 522 has instructions stored thereon that, when executed by the processor 520, cause the computing device 504 to perform at least part of any of the methods described herein.

In some embodiments, the communication device 524 is a wired communication device, such as an ethernet network card that allows wired data communication with a network or a peripheral connection port (e.g., universal serial bus port) that allows connection to an external peripheral. In some embodiments, the communication device 524 is a wireless communication device that allows data communication with a network access point or data communication with a local peripheral, such as a Bluetooth or 802.11 peripheral. In some embodiments, the communication device 524 allows data communication with at least a second camera. In some embodiments, the communication device 524 allows the processor to receive video information from the second camera through a wired data connection or a wireless data connection.

Figure 6:
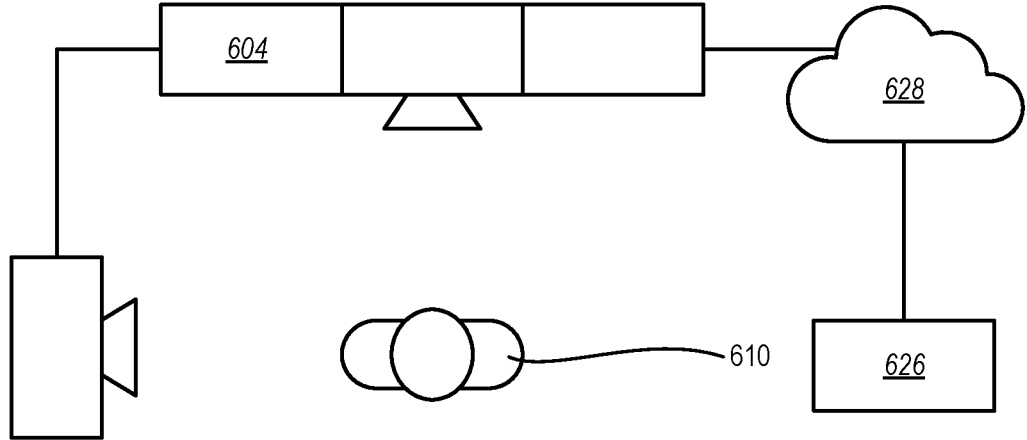
FIG. 6 is a system diagram of an exercise device in communication with a network, according to at least one embodiment of the present disclosure.

In some embodiments, the communication device 524 (or a second communication device) allows data communication with a network. FIG. 6 is a system diagram of an embodiment of a computing device 604 in communication with a remote computer 626 (e.g., server computer) via a network 628. In some embodiments, the remote computer 626 has information stored thereon that may be accessed or obtained by the computing device 604. For example, the remote computer 626 may be a workout server. A workout server is any computing device that stores or executes a workout application on one or more processors of the computing device. A workout server may be a general-purpose computing device or a specialized computing device. In some examples, the workout server may execute multiple workout routines. In some examples, the workout server has one or more applications stored on a local hardware storage device. In some examples, the workout server may access instructions stored on a hardware storage device that is connected to the workout server but is not local to the workout server.

In some embodiments, the remote computer 626 and/or workout server has one or more workout routines and/or workout exercises stored thereon. A workout routine is a predetermined set of instructions that may be provided to a user. Following the workout routine can guide, entertain, or encourage the user through one or more exercises to produce workout information. The workout routine may include video information, audio information, text information, still images, body frame information, or combinations thereof to communicate the workout routine to the user and allow the computing device to evaluate the user's form and/or performance.

In some embodiments, the computing device 604 may transmit information to the remote computer 626. For example, the computing device 604 may transmit workout information measured or recorded during a workout routine or exercise to the remote computer 626. In some embodiments, the workout server receives and/or stores workout information in respective workout sessions associated with a user account. In some embodiments, the workout server stores the workout information at the workout server. In some embodiments, the workout server compiles the information and/or analyzes the workout information, and the workout server sends at least a portion of the workout information or a summary of the workout session to a client device or to the computing device 604 for viewing. In an example, the workout server generates a workout session report with at least some of the workout information and sends the workout session report to the user for viewing on a client device or the computing device 604. The workout session report may be stored at the workout server.

A client device is any electronic device with network connectivity to receive and transmit information to a workout server. In particular examples, client devices include personal electronic devices, such as smartphones, tablet computers, desktop computers, laptop computers, hybrid computers, wearable electronic devices; television; automotive infotainment system; household appliance, or any other networked electronic device. In some embodiments, the client device views a workout routine from a workout server, and the client device transmits user inputs and/or workout information to the workout server.

In some embodiments, the computing device 604 and/or remote computer 626 are associated with a user account of the user 610 using the exercise system 600. For example, the user account is associated with the user 610 at the workout server, and the user 610 may access the user account to upload workout information from a current workout session, view workout information, download workout information, analyze workout information, or combinations thereof. In some embodiments, the user account is associated with the user 610 for a plurality of exercise devices and/or types of workouts. For example, the user account may allow a user 610 to use a single profile to track workout information across aerobic workouts, strength training, flexibility, cross-training, or other workout types. In some embodiments, a single profile can allow the user to use a single login that is consistent across exercise devices and/or client devices.

In some embodiments, the user account is associated with a database of workout information, workout sessions, workout routines, workout preferences, or combinations thereof that are available to the exercise system to provide user-specific information and recommendations. In some examples, the workout information, workout sessions, workout routines, and workout preferences are determined from the user's history of completed exercises and workouts. In some examples, the workout information, workout sessions, workout routines, and workout preferences are received from direct user inputs, such as selecting particular preferences from a predetermined set of options or user selections of workout routines to add to a queue of future workouts to complete.

Figures 1, 7:
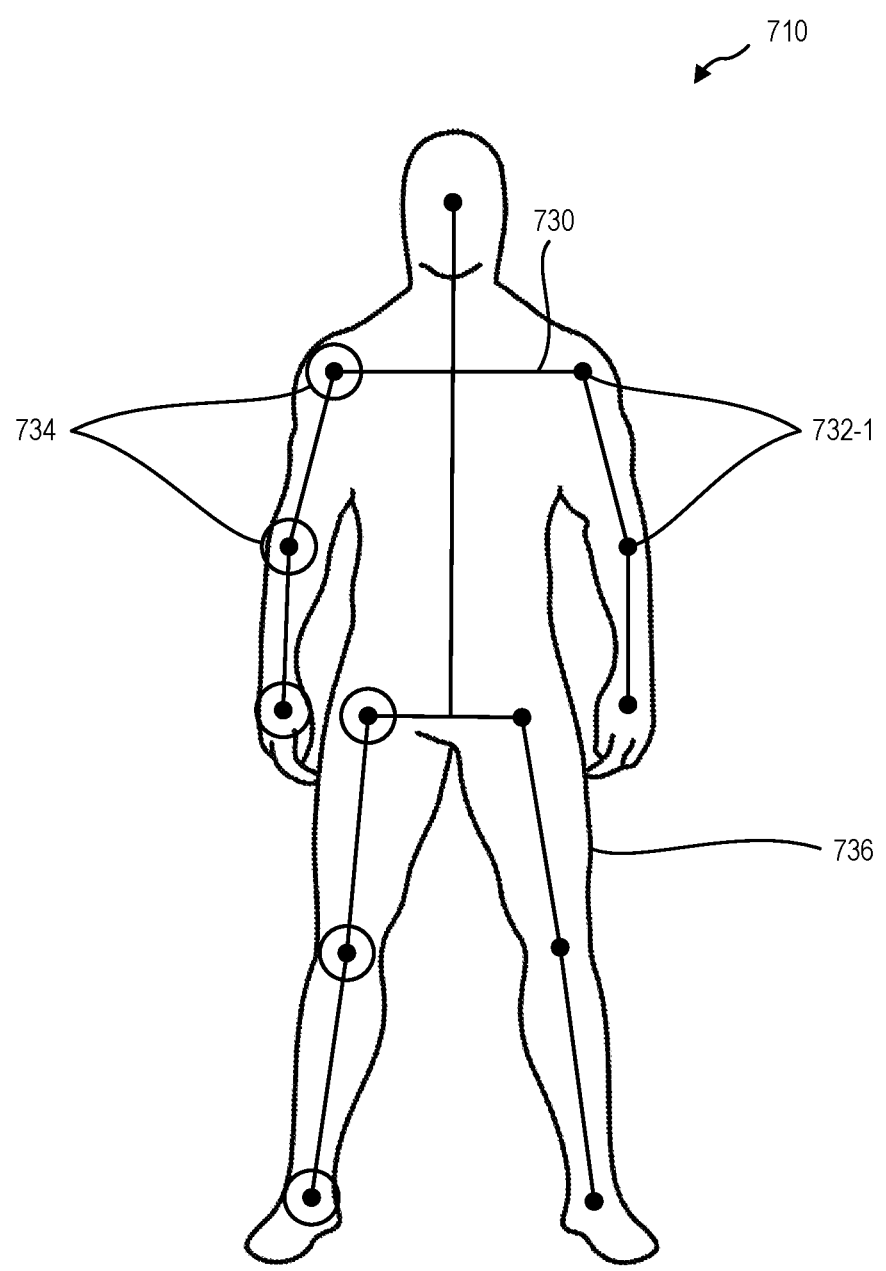
Figures 2, 7:
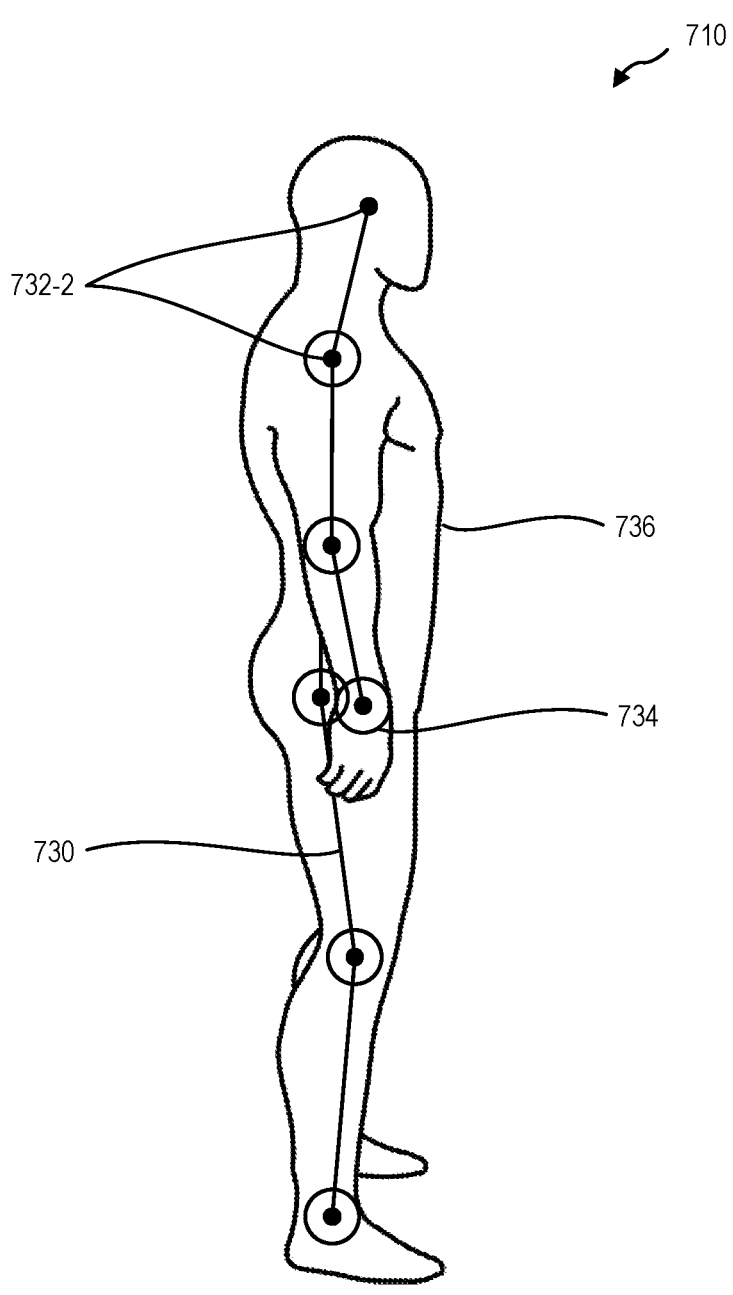

FIGS. 7-1 and 7-2 illustrate a front view (such as by a first camera) and a side view (such as by a second camera) of an embodiment of a user body frame 730. In some embodiments, a first camera captures a front view of the user 710, such as shown in FIG. 7-1. The visual information of the front view of the user 710 is provided to a processor (such as processor 520 of FIG. 5), and the processor identifies a first plurality of nodes 732-1 associated with a body of the user 710 in the front view. In some embodiments, a second camera captures a side view of the user 710, such as shown in FIG. 7-2. The visual information of the side view of the user 710 is provided to a processor (such as processor 520 of FIG. 5), and the processor identifies a second plurality of nodes 732-2 associated with a body of the user 710 in the side view.

The first plurality of nodes 732-1 and the second plurality of nodes 732-2 are compared to one another to identify a plurality of shared nodes that are common to both the first plurality of nodes 732-1 and the second plurality of nodes 732-2. A shared node 734 is a node that is identified in both the first plurality of nodes 732-1 and the second plurality of nodes 732-2 and allows the computing device to locate at least two of the shared nodes 734 of the user body frame 730 in three-dimensional space, providing x-, y-, and z-coordinates or displacements of the shared nodes relative to one another. In some embodiments, the first camera and/or second camera is a depth camera. For example, the first camera and/or second camera may use time-of-flight depth measurements, stereoscopic depth measurements, or other depth measurements to provide depth information in the front view and/or side view, respectively. In such embodiments, at least some of the first plurality of nodes 732-1 and the second plurality of nodes 732-2 include depth information prior to the computing device comparing the first plurality of nodes 732-1 and the second plurality of nodes 732-2 to create the plurality of shared nodes. The plurality of shared nodes may use at least part of the depth information from the first plurality of nodes 732-1 and the second plurality of nodes 732-2 to increase the precision and/or accuracy of the positional information of the user body frame 730.

In some embodiments, the user body frame 730 includes nodes located at least at the end of one limb and at the center of the user's torso to identify the movement of the limb. For example, a first node located at the user's hand and second node at the center of the user's chest may allow the computing device to approximate the position and movement of the user's arm. In some embodiments, the user body frame 730 includes nodes located at a plurality of articulation points of the user's body, such as joints. In at least one example, a user body frame 730 includes a first node at the user's hand, a second node at the user's wrist, a third node at the user's elbow, a fourth node at the user's shoulder, and a fifth node at the user's chest. Such a combination of nodes may allow the computing device to approximate the position and movement of the user's arm more precisely and/or accurately than the previous example. For example, the latter example may allow the tracking and measurement of form during a preacher curl exercise or other arm exercise performed by the user.

In some embodiments, a user body mesh 736 is calculated. For example, the user body mesh 736 can be calculated by combining depth information from one or both of the first camera and the second camera. In some embodiments, the depth information can be recorded as the user moves to receive depth information from all sides of the user, and the computing device can use the depth information to calculated a user body mesh 736 or wireframe of the user's body. In some embodiments, the user body mesh 736 can be correlated to the user body frame 730 to allow the computing device to move the user body mesh 736 when movements of the user body frame 730 are detected.

In some embodiments, the user body mesh 736 can be used to provide measurements of the user's body, such as waist measurements, chest measurements, height measurements, arm length measurements, etc. In some embodiments, the user body mesh 736 can allow the computing device to simulate a fit for clothing to the user's body based on the dimensions of the user body mesh 736. In other embodiments, the user body mesh 736 may be used to approximate a body mass index (BMI) for the user based on the relative dimensions and proportions measured.

Figure 8:
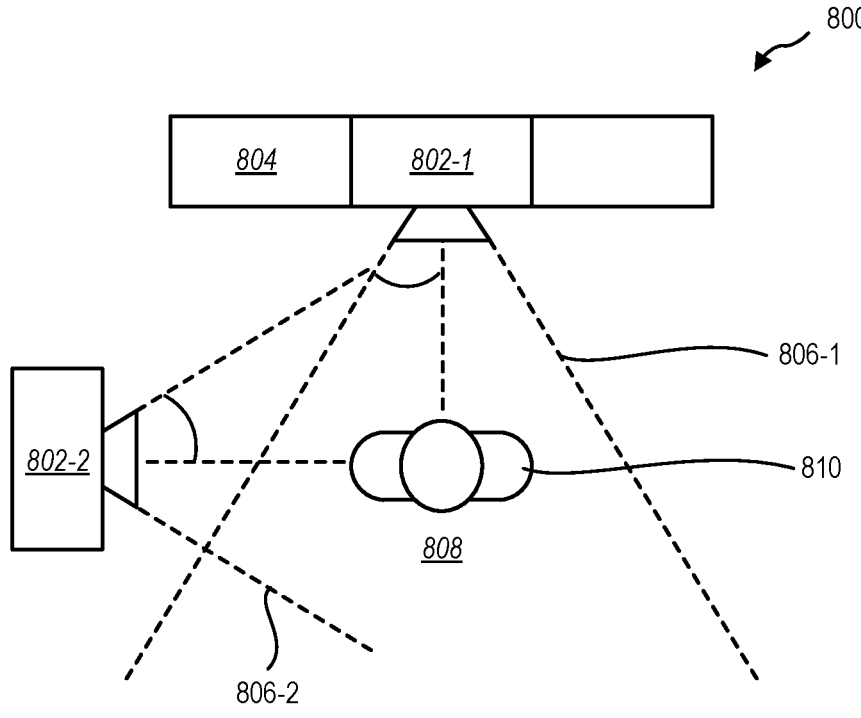
FIG. 8 is a top view of an exercise system during calibration, according to at least one embodiment of the present disclosure.

FIG. 8 is a top view of an embodiment of an exercise system 800 during calibration of the first camera 802-1 and the second camera 802-2. In some embodiments, the first camera 802-1 and the second camera 802-2 can image one another to measure the relative positions of the first camera 802-1 and second camera 802-2 to calibrate and/or assist in calibrating the exercise system 800 for creating the user body frame and/or user body mesh, such as described in relation to FIGS. 7-1 and 7-2. In some embodiments, the first camera 802-1 has a first FOV 806-1, and the second camera 802-2 has a second FOV 806-2. The first FOV 806-1 and second FOV 806-2 overlap in an overlapping FOV 808 where the user 810 may stand. In some embodiments, the first FOV 806-1 includes at least a portion of the second camera 802-2, and the second FOV 806-2 includes at least a portion of the first camera 802-1. The first camera 802-1 and second camera 802-2 may have a known angular width of each FOV, respectively, (such as a 150° first FOV 806-1 and a 140° second FOV 806-2), allowing the computing device 804 to determine the position of the first camera 802-1 and the second camera 802-2 relative to one another to calibrate the exercise system 800 with known locations of the first camera 802-1 and the second camera 802-2 and, hence, the first FOV 806-1 and the second FOV 806-2 used for the front view and side view of the user 810.

FIG. 9 is a flowchart illustrating an embodiment of a method 938 of exercise tracking. In some embodiments, the method 938 is performed by a local computing device (such as any computing device described herein) that is local to the first camera and/or second camera. For example, a local computing device may be integrated with the first camera. In some examples, the local computing device is directly connected to the first camera and/or second camera with a wired or wireless communication. In some embodiments, the method 938 is performed by a remote computing device that is remote to the first camera and/or a local computing device connected to the first camera. For example, a remote computing device may be a server computer that is in data communication with a local computing device that is, in turn, in data communication with the first camera and/or second camera. In some examples, the remote computing device is indirectly in data communication with the first camera and/or second camera via a network.

In some embodiments, the method 938 includes collecting a first image with a first camera at 940 and collecting a second image with a second camera at 942. In some embodiments, the first image and/or second image is part of a first video and/or a second video, respectively. The first image and the second image are collected with an angular displacement between the first camera and the second camera of at least 45°. In some embodiments, the first image and the second image are collected with an angular displacement between the first camera and the second camera of at least 60°. In some embodiments, the first image and the second image are collected with an angular displacement between the first camera and the second camera of approximately 90°.

In some embodiments, the method 938 further includes identifying at least a first part of a user body frame in the first image including a first plurality of nodes at 944, such as the first plurality of nodes described in relation to FIG. 7-1, and identifying at least a second part of the user body frame in the second image including a second plurality of nodes at 946, such as second plurality of nodes described in relation to FIG. 7-2. A shared subset of nodes (e.g., the plurality of shared nodes described in relation to FIGS. 7-1 and 7-2) includes at least two nodes of the first plurality of nodes identified in the second plurality of nodes. In some embodiments, the method 938 further includes correlating locations of the first plurality of nodes and the second plurality of nodes based on the shared subset of nodes (e.g., the plurality of shared nodes) at 948.

In at least one embodiment, the user body frame includes at least some nodes identified by a machine learning model (ML model). An ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some embodiments, a machine learning system, model, or neural network described herein is an artificial neural network. In some embodiments, a machine learning system, model, or neural network described herein is a convolutional neural network. In some embodiments, a machine learning system, model, or neural network described herein is a recurrent neural network. In at least one embodiment, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

For example, the ML model may be trained through supervised, unsupervised, or semi-supervised training. Supervised training includes providing a training dataset to the ML model with known user body frames and/or node locations for a provided image or images of a user. Unsupervised training includes providing a plurality of images of users and allowing the ML model to iterate and/or refine the identification of nodes for user body frames correlated to the provided images. Semi-supervised training includes training datasets that include both images with provided known user body frames and images with no associated user body frames.

FIG. 10 is a flowchart illustrating another embodiment of a method 1050 of exercise tracking. In some embodiments, the method 1050 is performed by a local computing device (such as any computing device described herein) that is local to the first camera and/or second camera. For example, a local computing device may be integrated with the first camera. In some examples, the local computing device is directly connected to the first camera and/or second camera with a wired or wireless communication. In some embodiments, the method 1050 is performed by a remote computing device that is remote to the first camera and/or a local computing device connected to the first camera. For example, a remote computing device may be a server computer that is in data communication with a local computing device that is, in turn, in data communication with the first camera and/or second camera. In some examples, the remote computing device is indirectly in data communication with the first camera and/or second camera via a network.

In some embodiments, the method 1050 includes identifying a three-dimensional (3D) user body frame with a plurality of nodes having 3D locations at 1052, such as by any of the methods described herein. In some embodiments, a 3D user body frame is a body frame in which at least one node of the plurality of nodes does not lie in a plane defined by three other nodes of the plurality of nodes. In some embodiments, the nodes have 3D locations that include either coordinates in a 3D reference frame (e.g., Cartesian coordinates, polar coordinates, or spherical coordinates) or displacements relative to one another in the 3D reference frame.

The method further includes obtaining a workout exercise including a movement of the plurality of nodes relative to one another at 1054. For example, the workout exercise may be obtained from a hardware storage device located locally to the processor of the computing device. In other examples, the workout exercise may be obtained from a remote computing device or hardware storage device, such as a workout server described herein. In some embodiments, the workout exercise may be obtained from a cache memory of the computing device after downloading the workout exercise from the workout server. In some embodiments, the workout exercise is part of a workout routine including a plurality of workout exercises and/or instructions for a user to complete the workout exercise a predetermined number of times in sequence and/or within a given time period. For example, the workout exercise may be part of a workout routine that instructs the user (such as via video information on a display device or audio information via headphones or speakers) to perform the workout exercise in three sets, with breaks between, of 10 repetitions in sequence.

In some embodiments, the workout exercise includes a movement of the plurality of nodes relative to one another that corresponds to a movement of the user's body in real time. The method 1050 includes tracking the 3D user body frame at 1056, such as by any embodiment of the method described in relation to FIG. 9. The method 1050 then includes comparing a motion and/or position of the 3D user body frame to the workout exercise (e.g., the movement of the plurality of nodes of the workout exercise) at 1058. In at least one embodiment, comparing the motion of the 3D user body frame to the workout exercise includes adjusting an initial position of at least one of the nodes of the workout exercise to correlate the nodes of the workout exercise with the plurality of nodes of the 3D user body frame. In some examples, aligning the 3D user body frame with a frame of the workout exercise before the user begins the workout exercise allows for more precise tracking and counting of repetitions, as different users have different proportions to their bodies. For example, a first user may be taller than a second user, or a first user may have proportionately longer arms or legs than a second user. In some examples, aligning the 3D user body frame with a frame of the workout exercise before the user begins the workout exercise allows the computing device to compensate for relative differences in the users' biomechanics. In some embodiments, the computing device can record the differences between the initial locations of the body frame of the workout exercise and the measured user body frame information to a user account, which may be stored on a workout server. For example, the distance between and/or relative position of nodes of the user body frame can be stored in user body frame information associated with the user account. The user body frame information can simplify detection and/or tracking of the user body frame in future exercise tracking. In some embodiments, the user body frame information can be used to identify a particular user.

The method 1050 further includes, in some embodiments, determining whether the locations of the plurality of nodes of the 3D user body frame match the locations and/or movements of the plurality of nodes proscribed by the workout exercise at 1060. When the locations of the plurality of nodes of the 3D user body frame match the locations and/or movements of the plurality of nodes proscribed by the workout exercise within a tolerance, the method includes incrementing a repetition counter at 1062. When the locations of the plurality of nodes of the 3D user body frame do not match the locations and/or movements of the plurality of nodes proscribed by the workout exercise within a tolerance, the method includes suggesting to the user a form correction to assist the user in performing the workout exercise correctly at 1064. In some embodiments, the locations of the plurality of nodes of the 3D user body frame match the locations and/or movements of the plurality of nodes proscribed by the workout exercise within a first tolerance, but not within a second tolerance. For example, when the computing device determines less than an 80% match, the computing device does not increment the repetition counter at 1062 and suggests a form correction at 1064, while a 90% match or greater results in incrementing the repetition counter at 1062 and not suggesting a form correction at 1064. In such an example, between 80% and 90%, the system may perform both incrementing the repetition counter at 1062 and suggesting a form correction at 1064.

In some embodiments, the tolerance(s) is measured per node position. For example, an arm lift with rotation about the shoulder (such as that described in relation to FIG. 2-1 through 2-3) may include holding the arm straight while rotating around the shoulder node. Bending the arm at the elbow may cause the elbow node of the 3D user body frame to mismatch with the elbow node of the workout exercise body frame, causing the comparison to fail the match determination. In some embodiments, the tolerance is measured as a total displacement or average displacement of the measured 3D user body frame nodes and the workout exercise body frame nodes. In the example above, the bend elbow may produce a mismatch between the measured 3D user body frame nodes and the workout exercise body frame nodes.

In some embodiments, only a portion of the body frames are compared or a first portion of the body frame is weighted more heavily in the comparison than a second portion of the frame. For example, in performing a squat exercise, a match/mismatch between the arm position of the 3D user body frame is less important, and therefore may be weighed less or ignored, relative to a match/mismatch of the torso, hips, and legs of the 3D user body frame to the workout exercise body frame.

When the 3D user body frame and the workout exercise body frame align within the tolerance throughout a full movement of the workout exercise, a repetition counter is incremented, and the user is given credit for completing the repetition toward completing the workout routine. When the 3D user body frame and the workout exercise body frame do not align within the tolerance, the method includes suggesting a form correction at 1064. For example, the form correction may include displaying on the display device an example of the proper form for the workout exercise. In some embodiments, the form correction suggestion includes highlighting at least the misaligned node of the 3D user body frame on a display device to communicate to the user the part of the user that is out of form. For example, a visual representation of the user's body and/or user body frame displayed on the display device may highlight portions of the body different colors based at least partially on the alignment of nodes within that portion of the body. In at least one example, a properly positioned portion of the user's body is highlighted green, a misaligned portion is highlighted red, a partially misaligned portion is highlighted yellow, and an undetected portion is grey.

In some embodiments, the form correction suggestion includes video and/or audio information presented to the user instructing the user to move a portion of the user's body corresponding to the misaligned node to align the 3D user body frame with the workout exercise body frame. By providing credit when the workout exercise movement is performed correctly and form correction suggestions when the user performs the workout exercise movement incorrectly, exercise systems and methods according to the present disclosure may improve safety and effectiveness of the workout exercise and/or routine for the user.

INDUSTRIAL APPLICABILITY

The present description generally relates to systems and methods for exercise tracking. In some embodiments, an exercise system includes at least a first camera and a second camera in data communication with a computing device. The first camera has a first FOV, and the second camera has a second FOV. The first FOV and second FOV overlap in an overlapping FOV.

In some embodiments, the overlapping FOV defines a volume of space in three-dimensions. In some embodiments, at least a portion of a user is positioned in the volume of the overlapping FOV such that the first camera and the second camera image the portion of the user within each camera's respective FOV. The different perspectives of the first FOV and second FOV allow the same part of the user to be imaged from two different perspectives, providing a location of that part of the user in three-dimensional space.

In some embodiments, the user is performing an arm lift exercise and has arms outstretched sideways from the upper body and is holding the arms approximately level to the ground. The user may perform the arm lift exercise with correct form, holding the arms in a plane of the upper body and moving the arms directly outward and upward from the sides of the upper body.

In other examples, the user may perform the arm lift exercise with incorrect form, holding the arms forward of a plane of the upper body and moving the arms forward (in front of the user) while moving the arms outward and upward from the sides of the upper body. The muscles engaged by the movements are different, producing a different exercise movement. In each example, a first camera positioned in front of the user and capturing the first FOV may have difficulty detecting the difference between the positions. In some embodiments, a two-camera exercise system can provide improved body tracking and improved feedback to a user for a more efficient workout experience and increased safety, as poor form, posture, or movement during exercise movements can increase a risk of injury.

In some embodiments, an exercise system includes a first camera, a second camera, and a display device in data communication with a computing device. In some embodiments, the display device and first camera are integrated with one another. For example, the first camera may be integrated into a bezel of the display device. In some examples, the first camera may be integrated behind a portion of the display panel of the display device, such as integrated into a portion of the pixel array of an LED display or behind a panel of a projection display. In some embodiments, having the first camera integrated with the display device will ensure the user is facing the first camera while viewing the display device. In some embodiments, the display device includes a reflective (e.g., mirror-like) cover panel that reflects exterior light, allowing the user to see their reflection in the cover panel, while also allowing light originating behind the cover panel, such as a backlit LED array or a self-emitting OLED array, to pass through and be emitted from the display panel. A reflective display panel can thereby provide video information to the user while the user is able to view their own reflection during a workout.

In some embodiments, the second camera is a standalone camera that is in data communication with the computing device. In some embodiments, the computing device is a first computing device and the second camera is part of second computing device. In some examples, the first computing device is a laptop computer, a desktop computer, a tablet computer, a hybrid computer, a set-top computer, or other computing device that is in data communication with the display panel and/or the first camera. In some examples, the first computing device may be integrated in a single housing with a display device and a first camera, such as a NORDICTRACK VAULT.

In some embodiments, the second camera communicates with the computing device or first camera via one or more wireless data transmission protocol, such as Bluetooth, 802.11ax, 802.11n, or other wireless communication standards. In some embodiments, the first camera and second camera are in wireless data communication with one another, and the first camera communicates the video information from both the first camera and the second camera to the computing device (such as to a processor of the computing device). In some embodiments, one or both of the first camera and second camera are in wireless data communication with the computing device. For example, the first camera may be in wired communication with the computing device and communicates the video information from the first camera to the computing device, while the second camera is in wireless communication with the computing device and sends the video information from the second camera to the computing device independently of the first camera. In at least one embodiment, the first camera is integrated into the computing device, and the second camera is in wireless communication with the computing device.

In some embodiments, the second camera is integrated into a second computing device and the second computing device transmits video information from the second camera to the first computing device. For example, the second camera may be integrated with or in wired communication with a laptop computer, a desktop computer, a tablet computer, a hybrid computer, a set-top computer, a smartphone, or other computing device. In at least one embodiment, the user may position a smartphone to his or her side to capture a side view relative to the first camera with a camera of the smartphone. In some examples, the smartphone may transmit video information from the camera of the smartphone to the computing device via a wireless communication. This may allow the exercise system to improve detection of the user and movements of the user by leveraging computing resources and a second camera that many users already have available.

In some embodiments, an exercise system includes a computing device with an integrated display device and a first camera. The computing device includes at least a processor in data communication with the display device and the first camera. The processor is further in data communication with a hardware storage device and a communication device.

In some embodiments, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device is local to and/or integrated with the computing device. The hardware storage device has instructions stored thereon that, when executed by the processor, cause the computing device to perform at least part of any of the methods described herein.

In some embodiments, the communication device is a wired communication device, such as an ethernet network card that allows wired data communication with a network or a peripheral connection port (e.g., universal serial bus port) that allows connection to an external peripheral. In some embodiments, the communication device is a wireless communication device that allows data communication with a network access point or data communication with a local peripheral, such as a Bluetooth or 802.11 peripheral. In some embodiments, the communication device allows data communication with at least a second camera. In some embodiments, the communication device allows the processor to receive video information from the second camera through a wired data connection or a wireless data connection.

In some embodiments, the communication device (or a second communication device) allows data communication with a network. For example, a computing device may be in communication with a remote computer (e.g., server computer) via a network. In some embodiments, the remote computer has information stored thereon that may be accessed or obtained by the computing device. For example, the remote computer may be a workout server. A workout server is any computing device that stores or executes a workout application on one or more processors of the computing device. A workout server may be a general-purpose computing device or a specialized computing device. In some examples, the workout server may execute multiple workout routines. In some examples, the workout server has one or more applications stored on a local hardware storage device. In some examples, the workout server may access instructions stored on a hardware storage device that is connected to the workout server but is not local to the workout server.

In some embodiments, the remote computer and/or workout server has one or more workout routines and/or workout exercises stored thereon. A workout routine is a predetermined set of instructions that may be provided to a user. Following the workout routine can guide, entertain, or encourage the user through one or more exercises to produce workout information. The workout routine may include video information, audio information, text information, still images, body frame information, or combinations thereof to communicate the workout routine to the user and allow the computing device to evaluate the user's form and/or performance.

In some embodiments, the computing device may transmit information to the remote computer. For example, the computing device may transmit workout information measured or recorded during a workout routine or exercise to the remote computer. In some embodiments, the workout server receives and/or stores workout information in respective workout sessions associated with a user account. In some embodiments, the workout server stores the workout information at the workout server. In some embodiments, the workout server compiles the information and/or analyzes the workout information, and the workout server sends at least a portion of the workout information or a summary of the workout session to a client device or to the computing device for viewing. In an example, the workout server generates a workout session report with at least some of the workout information and sends the workout session report to the user for viewing on a client device or the computing device. The workout session report may be stored at the workout server.

A client device is any electronic device with network connectivity to receive and transmit information to a workout server. In particular examples, client devices include personal electronic devices, such as smartphones, tablet computers, desktop computers, laptop computers, hybrid computers, wearable electronic devices; television; automotive infotainment system; household appliance, or any other networked electronic device. In some embodiments, the client device views a workout routine from a workout server, and the client device transmits user inputs and/or workout information to the workout server.

In some embodiments, the computing device and/or remote computer are associated with a user account of the user using the exercise system. For example, the user account is associated with the user at the workout server, and the user may access the user account to upload workout information from a current workout session, view workout information, download workout information, analyze workout information, or combinations thereof. In some embodiments, the user account is associated with the user for a plurality of exercise devices and/or types of workouts. For example, the user account may allow a user to use a single profile to track workout information across aerobic workouts, strength training, flexibility, cross-training, or other workout types. In some embodiments, a single profile can allow the user to use a single login that is consistent across exercise devices and/or client devices.

In some embodiments, the user account is associated with a database of workout information, workout sessions, workout routines, workout preferences, or combinations thereof that are available to the exercise system to provide user-specific information and recommendations. In some examples, the workout information, workout sessions, workout routines, and workout preferences are determined from the user's history of completed exercises and workouts. In some examples, the workout information, workout sessions, workout routines, and workout preferences are received from direct user inputs, such as selecting particular preferences from a predetermined set of options or user selections of workout routines to add to a queue of future workouts to complete.

In some embodiments, a first camera captures a front view of the user. The visual information of the front view of the user is provided to a processor, and the processor identifies a first plurality of nodes associated with a body of the user in the front view. In some embodiments, a second camera captures a side view of the user. The visual information of the side view of the user is provided to the processor, and the processor identifies a second plurality of nodes associated with a body of the user in the side view.

The first plurality of nodes and the second plurality of nodes are compared to one another to identify a plurality of shared nodes that are common to both the first plurality of nodes and the second plurality of nodes. A shared node is a node that is identified in both the first plurality of nodes and the second plurality of nodes and allows the computing device to locate at least two of the shared nodes of the user body frame in three-dimensional space, providing x-, y-, and z-coordinates or displacements of the shared nodes relative to one another. In some embodiments, the first camera and/or second camera is a depth camera. For example, the first camera and/or second camera may use time-of-flight depth measurements, stereoscopic depth measurements, or other depth measurements to provide depth information in the front view and/or side view, respectively. In such embodiments, at least some of the first plurality of nodes and the second plurality of nodes include depth information prior to the computing device comparing the first plurality of nodes and the second plurality of nodes to create the plurality of shared nodes. The plurality of shared nodes may use at least part of the depth information from the first plurality of nodes and the second plurality of nodes to increase the precision and/or accuracy of the positional information of the user body frame.

In some embodiments, user body frame includes nodes located at least at the end of one limb and at the center of the user's torso to identify the movement of the limb. For example, a first node located at the user's hand and second node at the center of the user's chest may allow the computing device to approximate the position and movement of the user's arm. In some embodiments, the user body frame includes nodes located at a plurality of articulation points of the user's body, such as joints. In at least one example, a user body frame includes a first node at the user's hand, a second node at the user's wrist, a third node at the user's elbow, a fourth node at the user's shoulder, and a fifth node at the user's chest. Such a combination of nodes may allow the computing device to approximate the position and movement of the user's arm more precisely and/or accurately than the previous example. For example, the latter example may allow the tracking and measurement of form during a preacher curl exercise or other arm exercise performed by the user.

In some embodiments, a user body mesh is calculated. For example, the user body mesh can be calculated by combining depth information from one or both of the first camera and the second camera. In some embodiments, the depth information can be recorded as the user moves to receive depth information from all sides of the user, and the computing device can use the depth information to calculated a user body mesh or wireframe of the user's body. In some embodiments, the user body mesh can be correlated to the user body frame to allow the computing device to move the user body mesh when movements of the user body frame are detected.

In some embodiments, the user body mesh can be used to provide measurements of the user's body, such as waist measurements, chest measurements, height measurements, arm length measurements, etc. In some embodiments, the user body mesh can allow the computing device to simulate a fit for clothing to the user's body based on the dimensions of the user body mesh. In other embodiments, the user body mesh may be used to approximate a body mass index (BMI) for the user based on the relative dimensions and proportions measured.

In some embodiments, the first camera and the second camera can image one another to measure the relative positions of the first camera and second camera to calibrate and/or assist in calibrating the exercise system for creating the user body frame and/or user body mesh. In some embodiments, the first camera has a first FOV, and the second camera has a second FOV. The first FOV and second FOV overlap in an overlapping FOV where the user may stand. In some embodiments, the first FOV includes at least a portion of the second camera, and the second FOV includes at least a portion of the first camera. The first camera and second camera may have a known angular width of each FOV, respectively, (such as a 150° first FOV and a 140° second FOV), allowing the computing device to determine the position of the first camera and the second camera relative to one another to calibrate the exercise system with known locations of the first camera and the second camera and, hence, the first FOV and second FOV used for the front view and side view of the user.

In some embodiments, a method of exercise tracking includes collecting a first image with a first camera and collecting a second image with a second camera. In some embodiments, the method is performed by a local computing device (such as any computing device described herein) that is local to the first camera and/or second camera. For example, a local computing device may be integrated with the first camera. In some examples, the local computing device is directly connected to the first camera and/or second camera with a wired or wireless communication. In some embodiments, the method is performed by a remote computing device that is remote to the first camera and/or a local computing device connected to the first camera. For example, a remote computing device may be a server computer that is in data communication with a local computing device that is, in turn, in data communication with the first camera and/or second camera. In some examples, the remote computing device is indirectly in data communication with the first camera and/or second camera via a network.

In some embodiments, the first image and/or second image is part of a first video and/or a second video, respectively. The first image and the second image are collected with an angular displacement between the first camera and the second camera of at least 45°. In some embodiments, the first image and the second image are collected with an angular displacement between the first camera and the second camera of at least 60°. In some embodiments, the first image and the second image are collected with an angular displacement between the first camera and the second camera of approximately 90°.

In some embodiments, the method further includes identifying at least a first part of a user body frame in the first image including a first plurality of nodes and identifying at least a second part of the user body frame in the second image including a second plurality of nodes. A shared subset of nodes (e.g., the plurality of shared nodes) includes at least two nodes of the first plurality of nodes identified in the second plurality of nodes. In some embodiments, the method further includes correlating locations of the first plurality of nodes and the second plurality of nodes based on the shared subset of nodes.

In at least one embodiment, the user body frame includes at least some nodes identified by a machine learning model (ML model). An ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some embodiments, a machine learning system, model, or neural network described herein is an artificial neural network. In some embodiments, a machine learning system, model, or neural network described herein is a convolutional neural network. In some embodiments, a machine learning system, model, or neural network described herein is a recurrent neural network. In at least one embodiment, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

For example, the ML model may be trained through supervised, unsupervised, or semi-supervised training. Supervised training includes providing a training dataset to the ML model with known user body frames and/or node locations for a provided image or images of a user. Unsupervised training includes providing a plurality of images of users and allowing the ML model to iterate and/or refine the identification of nodes for user body frames correlated to the provided images. Semi-supervised training includes training datasets that include both images with provided known user body frames and images with no associated user body frames.

In some embodiments, a method of exercise tracking includes identifying a three-dimensional (3D) user body frame with a plurality of nodes having 3D locations, such as by any of the methods described herein. In some embodiments, a 3D user body frame is a body frame in which at least one node of the plurality of nodes does not lie in a plane defined by three other nodes of the plurality of nodes. In some embodiments, the nodes have 3D locations that include either coordinates in a 3D reference frame (e.g., Cartesian coordinates, polar coordinates, or spherical coordinates) or displacements relative to one another in the 3D reference frame.

The method further includes obtaining a workout exercise including a movement of the plurality of nodes relative to one another. For example, the workout exercise may be obtained from a hardware storage device located locally to the processor of the computing device. In other examples, the workout exercise may be obtained from a remote computing device or hardware storage device, such as a workout server described herein. In some embodiments, the workout exercise may be obtained from a cache memory of the computing device after downloading the workout exercise from the workout server. In some embodiments, the workout exercise is part of a workout routine including a plurality of workout exercises and/or instructions for a user to complete the workout exercise a predetermined number of times in sequence and/or within a given time period. For example, the workout exercise may be part of a workout routine that instructs the user (such as via video information on a display device or audio information via headphones or speakers) to perform the workout exercise in three sets, with breaks between, of 10 repetitions in sequence.

In some embodiments, the workout exercise includes a movement of the plurality of nodes relative to one another that corresponds to a movement of the user's body in real time. The method includes tracking the 3D user body frame, such as by any embodiment of the method described herein. The method then includes comparing a motion of the 3D user body frame to the workout exercise (e.g., the movement of the plurality of nodes of the workout exercise). In at least one embodiment, comparing the motion of the 3D user body frame to the workout exercise includes adjusting an initial position of at least one of the nodes of the workout exercise to correlate the nodes of the workout exercise with the plurality of nodes of the 3D user body frame. In some examples, aligning the 3D user body frame with a frame of the workout exercise before the user begins the workout exercise allows for more precise tracking and counting of repetitions, as different users have different proportions to their bodies. For example, a first user may be taller than a second user, or a first user may have proportionately longer arms or legs than a second user. In some examples, aligning the 3D user body frame with a frame of the workout exercise before the user begins the workout exercise allows the computing device to compensate for relative differences in the users' biomechanics. In some embodiments, the computing device can record the differences between the initial locations of the body frame of the workout exercise and the measured user body frame information to a user account, which may be stored on a workout server. For example, the distance between and/or relative position of nodes of the user body frame can be stored in user body frame information associated with the user account. The user body frame information can simplify detection and/or tracking of the user body frame in future exercise tracking. In some embodiments, the user body frame information can be used to identify a particular user.

The method further includes, in some embodiments, determining whether the locations of the plurality of nodes of the 3D user body frame match the locations and/or movements of the plurality of nodes proscribed by the workout exercise. When the locations of the plurality of nodes of the 3D user body frame match the locations and/or movements of the plurality of nodes proscribed by the workout exercise within a tolerance, the method includes incrementing a repetition counter. When the locations of the plurality of nodes of the 3D user body frame do not match the locations and/or movements of the plurality of nodes proscribed by the workout exercise within a tolerance, the method includes suggesting to the user a form correction to assist the user in performing the workout exercise correctly.

In some embodiments, the tolerance(s) is measured per node position. For example, an arm lift with rotation about the shoulder may include holding the arm straight while rotating around the shoulder node. Bending the arm at the elbow may cause the elbow node of the 3D user body frame to mismatch with the elbow node of the workout exercise body frame, causing the comparison to fail the match determination. In some embodiments, the tolerance is measured as a total displacement or average displacement of the measured 3D user body frame nodes and the workout exercise body frame nodes. In the example above, the bend elbow may produce a mismatch between the measured 3D user body frame nodes and the workout exercise body frame nodes.

In some embodiments, only a portion of the body frames are compared, or a first portion of the body frame is weighted more heavily in the comparison than a second portion of the frame. For example, in performing a squat exercise, a match/mismatch between the arm position of the 3D user body frame is less important, and therefore may be weighed less or ignored, relative to a match/mismatch of the torso, hips, and legs of the 3D user body frame to the workout exercise body frame.

When the 3D user body frame and the workout exercise body frame align within the tolerance throughout a full movement of the workout exercise, a repetition counter is incremented, and the user is given credit for completing the repetition toward completing the workout routine. When the 3D user body frame and the workout exercise body frame do not align within the tolerance, the method includes suggesting a form correction at 1064. For example, the form correction may include displaying on the display device an example of the proper form for the workout exercise. In some embodiments, the form correction suggestion includes highlighting at least the misaligned node of the 3D user body frame on a display device to communicate to the user the part of the user that is out of form. For example, a visual representation of the user's body and/or user body frame displayed on the display device may highlight portions of the body different colors based at least partially on the alignment of nodes within that portion of the body. In at least one example, a properly positioned portion of the user's body is highlighted green, a misaligned portion is highlighted red, a partially misaligned portion is highlighted yellow, and an undetected portion is grey.

In some embodiments, the form correction suggestion includes video and/or audio information presented to the user instructing the user to move a portion of the user's body corresponding to the misaligned node to align the 3D user body frame with the workout exercise body frame. By providing credit when the workout exercise movement is performed correctly and form correction suggestions when the user performs the workout exercise movement incorrectly, exercise systems and methods according to the present disclosure may improve safety and effectiveness of the workout exercise and/or routine for the user.

In some embodiments, the present disclosure relates to system and methods for exercise tracking according to any of the sections below:

[A1] In some embodiments, a method of exercise tracking includes collecting a first image of a first field of view (FOV) with a first camera and collecting a second image of a second FOV with a second camera. The method further includes identifying at least part of a user body frame in the first image including a first plurality of nodes and identifying at least part of the user body frame in the second image including a second plurality of nodes. A shared subset of nodes includes at least two nodes of the first plurality of nodes identified in the second plurality of nodes. The method includes correlating locations of the first plurality of nodes and the second plurality of nodes based on the shared subset of nodes.

[A2] In some embodiments, at least a portion of first FOV and second FOV of [A1] overlap in an overlapping FOV.

[A3] In some embodiments, the first camera and second camera of [A1] or [A2] are oriented at least 45° from one another.

[A4] In some embodiments, at least one of the first camera is in the second FOV and the second camera is in the first FOV of any of [A1] through [A3].

[A5] In some embodiments, at least one node of the first plurality of nodes of the first image of any of [A1] through [A4] includes depth information.

[A6] In some embodiments, at least one node of the second plurality of nodes of the second image of any of [A1] through [A5] includes depth information.

[A7] In some embodiments, the method of any of [A1] through [A6] includes calculating a user body mesh using at least one of the first camera and the second camera.

[A8] In some embodiments, the method of any of [A1] through [A7] is performed at a local computing device.

[A9] In some embodiments, identifying at least a part of the user body frame of any of [A1] through [A8] includes inputting one or both of the first image and second image into a machine learning system.

[B1] In some embodiments, a system for exercise tracking includes a first camera, a second camera, and a computing device in data communication with the first camera and the second camera. The computing device includes a processor and a hardware storage device in data communication with the processor. The hardware storage device has instructions stored thereon that, when executed by the processor, cause the computing device to receive a first image from the first camera and receive a second image from the second camera. The instructions further cause the computing device to identify at least a part of a user body frame in the first image including a first plurality of nodes and identify the user body frame in the second image including a second plurality of nodes. A plurality of shared nodes includes at least two nodes of the first plurality of nodes identified in the second plurality of nodes. The instructions further cause the computing device to correlate locations of the first plurality of nodes and the second plurality of nodes based on the plurality of shared nodes.

[B2] In some embodiments, the first camera of [B1] is a depth camera.

[B3] In some embodiments, the second camera of [B1] or [B2] is a depth camera.

[B4] In some embodiments, the system of any of [B1] through [B3] includes a workout server in data communication with the computing device via a network.

[B5] In some embodiments, the workout server of [B4] has a user account stored thereon, and the user account includes user body frame information.

[B6] In some embodiments, the instructions of any of [B1] through [B4] further cause the computing device to identify a 3D user body frame based at least partially on correlated locations of the first plurality of nodes and the second plurality of nodes based on the plurality of shared nodes, obtain a workout exercise including movement of a workout exercise body frame, track the 3D user body frame, and compare a motion of the 3D user body frame to the workout exercise body frame. Based at least partially on the comparison, the instructions further cause the computing device to determine a match in the motion of the 3D user body frame to the workout exercise body frame and, based at least partially on the match, select at least one of suggest a form correction and increment a repetition counter.

[C1] In some embodiments, a method of exercise tracking includes identifying a three-dimensional (3D) user body frame with a plurality of nodes having 3D locations, obtaining a workout exercise including movement of the plurality of nodes relative to one another, tracking the 3D user body frame, and comparing a motion of the 3D user body frame to the workout exercise. The method further includes determining a match in the motion of the 3D user body frame to the workout exercise and, based at least partially on the match, selecting at least one of suggesting a form correction and incrementing a repetition counter.

[C2] In some embodiments, determining the match of [C1] includes comparing the match to a first tolerance and a second tolerance.

[C3] In some embodiments, selecting at least one of suggesting a form correction and incrementing a repetition counter of [C1] or [C2] includes selecting both of suggesting a form correction and incrementing a repetition counter.

[C4] In some embodiments, obtaining a workout exercise of any of [C1] through [C3] includes accessing a workout server.

[C5] In some embodiments, suggesting a form correction of any of [C1] through [C4] includes displaying on a display device a visual representation of a misaligned portion of the user body frame.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for exercise tracking, the system comprising:
a first camera;
a second camera; and
a computing device in data communication with the first camera and the second camera, the computing device comprising:
a processor; and
a hardware storage device in data communication with the processor, the hardware storage device having instructions stored thereon that, when executed by the processor, cause the computing device to:
receive a first image from the first camera,
receive a second image from the second camera,
identify at least a part of a user body frame in the first image including a first plurality of nodes,
identify the user body frame in the second image including a second plurality of nodes, wherein a plurality of shared nodes includes at least two nodes of the first plurality of nodes identified in the second plurality of nodes,
correlate locations of the first plurality of nodes and the second plurality of nodes based on the plurality of shared nodes to identify a three-dimensional (3D) user body frame;
determine a single metric quantifying a match of a first movement of the 3D user body frame to a second movement of a workout exercise body frame;
compare the single metric quantifying the match to a first tolerance and a second tolerance different from the first tolerance; and
select at least one of suggesting a form correction and incrementing a repetition counter according to whether the single metric is within the first toler-
ance, within the second tolerance, or both.

2. The system of claim 1, wherein the first camera is a
depth camera.

3. The system of claim 1, wherein the second camera is a
depth camera.

4. The system of claim 1, further comprising a workout
server in data communication with the computing device via
a network.

5. The system of claim 4, wherein the workout server has
a user account stored thereon, and wherein the instructions,
when executed by the processor, further cause the comput-
ing device to:
    store user body frame information of the 3D user body
        frame to the user account based at least in part on
        identifying the 3D user body frame; and
    access the user body frame information from the user
        account for subsequent exercise tracking.

6. The system of claim 5, wherein the instructions, when
executed by the processor, further cause the computing
device to:
    identify a user associated with the user account for the
        subsequent exercise tracking based at least in part on
        the stored user body frame information, a third image
        of the user from the first camera, and a fourth image of
        the user from the second camera.

7. The system of claim 5, wherein the user body frame
information comprises a displacement between an initial
location of at least one node of the 3D user body frame and
an initial location of at least one corresponding node of the
workout exercise body frame, displacements between initial
locations of at least two nodes of the 3D user body frame,
or a combination thereof.

8. The system of claim 1, the instructions further causing
the computing device to:
    obtain a workout exercise including the second movement
        of the workout exercise body frame; and
    track the first movement of the 3D user body frame over
        time, wherein the single metric quantifying the match
        is determined based at least in part on comparing the
        first movement of the 3D user body frame to the second
        movement of the workout exercise body frame.

9. The system of claim 8, wherein the instructions further
cause the computing device to:
    suggest the form correction and increment the repetition
        counter based at least in part on the single metric
        quantifying the match satisfying the first tolerance and
        failing to satisfy the second tolerance.

10. The system of claim 8, wherein, to obtain the workout
exercise, the instructions further cause the computing device
to access a workout server.

11. The system of claim 8, wherein the instructions further
cause the computing device to:
    suggest the form correction based at least partially on the
        single metric quantifying the match not being within
        the second tolerance.

12. The system of claim 11, further comprising:
a display device in data communication with the comput-
    ing device, wherein, to suggest the form correction, the
    instructions, when executed by the processor, cause the
    computing device to:
        display, on the display device, the 3D user body frame,
            wherein a first portion of the 3D user body frame is
            displayed as a different color than a second portion
            of the 3D user body frame based at least in part on
            respective alignments of the first portion and the second portion with the workout exercise body
frame, detection of the first portion and the second
portion, or both.

13. The system of claim 8, wherein the instructions further
cause the computing device to:
    increment the repetition counter based at least partially on
        the single metric quantifying the match being within
        the first tolerance.

14. The system of claim 8, wherein, to obtain the workout
exercise, the instructions further cause the computing device
to:
    align the 3D user body frame with the workout exercise
        body frame before a user begins the workout exercise.

15. The system of claim 8, wherein, to determine the
single metric quantifying the match, the instructions, when
executed by the processor, cause the computing device to:
    compare the first movement of the 3D user body frame to
        the second movement of the workout exercise body
        frame, wherein a first match of a first portion of the 3D
        user body frame is weighted differently than a second
        match of a second portion of the 3D user body frame in
        determining the single metric based at least in part on
        the workout exercise.

16. The system of claim 1, wherein the single metric
comprises a percentage of nodes of the 3D user body frame
that match the second movement of the workout exercise
body frame within a tolerance, a sum of displacements of the
nodes of the 3D user body frame from corresponding nodes
of the workout exercise body frame, an average of the
displacements of the nodes of the 3D user body frame from
the corresponding nodes of the workout exercise body
frame, or any combination thereof.

17. A system for exercise tracking, the system comprising:
a first camera;
a second camera; and
a computing device in data communication with the first
    camera and the second camera, the computing device
    comprising:
    a processor; and
    a hardware storage device in data communication with
        the processor, the hardware storage device having
        instructions stored thereon that, when executed by
        the processor, cause the computing device to:
        receive a first image from the first camera,
        receive a second image from the second camera,
        identify at least a part of a user body frame in the first
            image including a first plurality of nodes,
        identify the user body frame in the second image
            including a second plurality of nodes, wherein a
            plurality of shared nodes includes at least two
            nodes of the first plurality of nodes identified in
            the second plurality of nodes,
        correlate locations of the first plurality of nodes and
            the second plurality of nodes based on the plural-
            ity of shared nodes to identify a 3D user body
            frame,
        obtain a workout exercise including a first movement
            of a workout exercise body frame,
        align the 3D user body frame with a frame of the
            workout exercise before a user begins the workout
            exercise,
        track a second movement of the 3D user body frame,
        determine a single metric quantifying a match in the
            second movement of the 3D user body frame to
            the first movement of the workout exercise body
            frame based at least in part on a comparison of the
            first movement to the second movement, suggest a form correction based at least partially on
the single metric not being within a first tolerance,
and increment a repetition counter based at least partially
on the single metric being within a second toler-
ance.

* * * * *